(12) United States Patent
Chu

(10) Patent No.: US 10,824,996 B1
(45) Date of Patent: Nov. 3, 2020

(54) APPOINTMENT SCHEDULING SERVICE

(71) Applicant: King Wing Chu, River Edge, NJ (US)

(72) Inventor: King Wing Chu, River Edge, NJ (US)

( * ) Notice: Subject to any disclaimer, the term of this patent is extended or adjusted under 35 U.S.C. 154(b) by 870 days.

(21) Appl. No.: 15/089,015

(22) Filed: Apr. 1, 2016

Related U.S. Application Data

(60) Provisional application No. 62/142,880, filed on Apr. 3, 2015.

(51) Int. Cl.
*G06Q 10/00* (2012.01)
*G06Q 10/10* (2012.01)

(52) U.S. Cl.
CPC ................ *G06Q 10/1095* (2013.01)

(58) Field of Classification Search
None
See application file for complete search history.

(56) References Cited

U.S. PATENT DOCUMENTS

| | | | |
|---|---|---|---|
| 6,973,432 B1 | 12/2005 | Woodard et al. | |
| RE43,068 E | 1/2012 | Woodard et al. | |
| 2006/0026032 A1* | 2/2006 | Higgins | G06Q 50/167 705/316 |
| 2007/0118426 A1* | 5/2007 | Barnes, Jr. | G06Q 30/06 379/114.13 |
| 2007/0262860 A1* | 11/2007 | Salinas | G06Q 30/02 340/539.12 |
| 2008/0059256 A1* | 3/2008 | Lynch | G06Q 10/063 705/7.24 |
| 2009/0002851 A1* | 1/2009 | Woodard | G02B 7/00 359/815 |
| 2009/0063232 A1* | 3/2009 | Lissack | G06Q 10/1095 705/7.21 |
| 2009/0070178 A1* | 3/2009 | Gilbert | G06Q 10/109 705/7.19 |
| 2009/0219133 A1* | 9/2009 | Woodard | G07C 9/00571 340/5.65 |
| 2009/0240550 A1* | 9/2009 | McCarty | G06Q 50/16 705/7.13 |
| 2010/0118421 A1* | 5/2010 | Woodard | G02B 7/00 359/815 |
| 2010/0268379 A1* | 10/2010 | Woodard | G06Q 10/00 700/237 |

(Continued)

OTHER PUBLICATIONS

Glickman, Jodi, Scheduling a Meeting the Right Way, Mar. 17, 2011, Harvard Business Review, https://hbr.org/2011/03/scheduling-a-meeting-the-right, p. 1-4.*

*Primary Examiner* — Joseph M Waesco
(74) *Attorney, Agent, or Firm* — Van Court & Aldridge LLP

(57) ABSTRACT

An online scheduling service subsystem may create a first account with first account data associated with a first entity, create a first listing with first listing data associated with a first construct, create a second account with second account data associated with a second entity, create a second listing with second listing data associated with a second construct, create a third account with third account data associated with a third entity, receive a request from the third account to schedule a showing including a first appointment for the third entity and the first entity at the first construct and a second appointment for the third entity and the second entity at the second construct, and, in response to receiving the request, generate a schedule for the showing based on the first account data, the second account data, the third account data, the first listing data, and the second listing data.

20 Claims, 33 Drawing Sheets

(56) References Cited

U.S. PATENT DOCUMENTS

| | | | | |
|---|---|---|---|---|
| 2011/0215933 A1* | 9/2011 | Darling, IV | ......... | G06Q 10/109 340/573.1 |
| 2011/0251974 A1* | 10/2011 | Woodard | ............... | G06Q 30/02 705/348 |
| 2011/0320372 A1* | 12/2011 | Woodard | ........... | G07C 9/00571 705/313 |
| 2013/0254670 A1* | 9/2013 | Eraker | ................... | G06Q 30/00 715/738 |
| 2014/0122154 A1* | 5/2014 | Kellogg | .................. | H04L 51/14 705/7.19 |
| 2014/0236350 A1* | 8/2014 | Woodard | ......... | G06Q 10/06311 700/237 |
| 2014/0258042 A1* | 9/2014 | Butler | .................... | G06Q 50/16 705/26.63 |
| 2015/0170299 A1* | 6/2015 | Wilson | .................. | G06Q 50/16 705/313 |
| 2015/0170300 A1* | 6/2015 | Wilson | .................. | G06Q 30/06 705/313 |
| 2015/0234636 A1* | 8/2015 | Barnes, Jr. | ............. | G06Q 20/32 715/728 |
| 2015/0235332 A1* | 8/2015 | Styve | ..................... | G06Q 50/16 705/7.13 |
| 2015/0317581 A1* | 11/2015 | Fawaz | .................... | G06Q 50/16 705/313 |
| 2016/0078411 A1* | 3/2016 | DiCarlo | ............... | G06Q 50/167 705/316 |
| 2016/0098806 A1* | 4/2016 | Chen | ...................... | G06O 50/16 705/313 |
| 2016/0132807 A1* | 5/2016 | Camenzind | ............ | G06Q 50/18 705/7.23 |
| 2016/0132818 A1* | 5/2016 | Camenzind | .... | G06Q 10/063114 705/7.15 |

* cited by examiner

Choose Showing to Attend

○ Sunday Mar 22nd, 2015

11:07 AM - 11:37 AM
*Drive Time : 14 minutes*
lester 2 home
123 Lake Ave. Apt 2,
Ridgewood, New Jersey(NJ) 07450

11:41 AM - 12:11 PM
*Drive Time : 04 minutes*
lester 3 Home
47 Fairview St.,
Ridgewood, New Jersey(NJ) 07450

12:41 PM - 01:11 PM
*Drive Time : 30 minutes*
Bayford house
590 Gorge Road,
Cliffside Park, New Jersey(NJ) 7010

○ Friday Mar 27th, 2015

09:14 AM - 09:44 AM
*Drive Time : 14 minutes*
lester 2 home
123 Lake Ave. Apt 2,
Ridgewood, New Jersey(NJ) 07450

09:48 AM - 10:18 AM
*Drive Time : 04 minutes*
lester 3 Home
47 Fairview St.,
Ridgewood, New Jersey(NJ) 07450

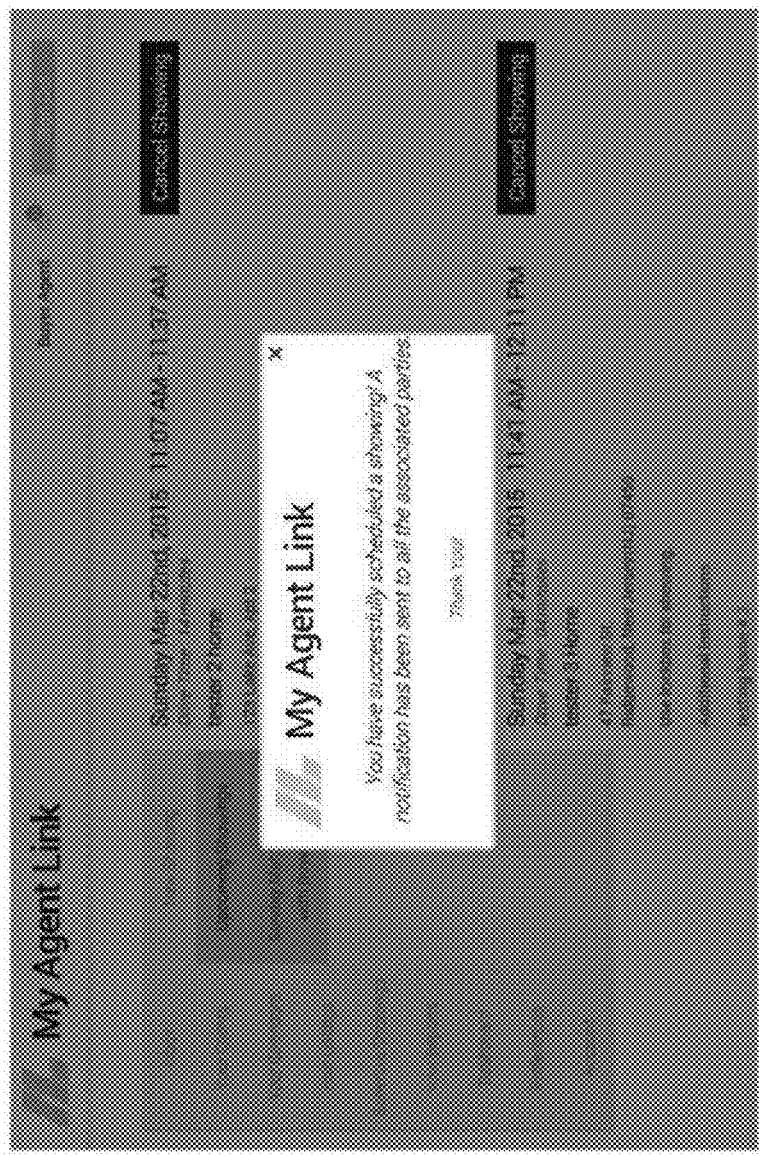

My Agent Link

Buyer Agent

Sunday Mar 22nd, 2015  11:07 AM - 11:37 AM
Door Time / 14 minutes
tester 2 home
123 Lake Ave, Apt 2
Ridgewood, New Jersey(NJ) 07450
Listing agent must be present during showing
Lock location for showing
Additional instructions
Driving distance of search Cancel Showing

Sunday Mar 22nd, 2015  11:41 AM - 12:11 PM
Door Time / 14 minutes
tester 3 Home
47 Fairview St,
Ridgewood, New Jersey(NJ) 07450
Lock location for showing
Additional instructions
Driving home # 0

Cancel Showing

APPOINTMENT SCHEDULING SERVICE

CROSS-REFERENCE TO RELATED APPLICATION(S)

This application claims the benefit of prior filed U.S. Provisional Patent Application No. 62/142,880, filed Apr. 3, 2015, which is hereby incorporated by reference herein in its entirety.

TECHNICAL FIELD

This disclosure relates to a scheduling service and, more particularly, to an appointment scheduling service for multiple real estate appointments.

BACKGROUND OF THE DISCLOSURE

Scheduling one or more appointments to be held at one or more locations between two or more parties is often a necessary component of achieving a real estate transaction. However, heretofore, there has not been provided an easy way for multiple parties to schedule such appointments.

SUMMARY OF THE DISCLOSURE

This document describes systems, methods, and computer-readable media for a scheduling service.

For example, a method may be provided that includes creating, with an online scheduling service subsystem, a first client account that includes first client account data associated with a first client entity, creating, with the online scheduling service subsystem, a first listing that includes first listing data associated with a first construct, creating, with the online scheduling service subsystem, a second client account that includes second client account data associated with a second client entity, creating, with the online scheduling service subsystem, a second listing that includes second listing data associated with a second construct, creating, with the online scheduling service subsystem, a third client account that includes third client account data associated with a third client entity, receiving, with the online scheduling service subsystem, a request from the third client account to schedule a showing within a particular time frame, wherein the showing includes a first appointment for the third client entity and the first client entity at the first construct and a second appointment for the third client entity and the second client entity at the second construct, and, in response to receiving the request, generating, with the online scheduling service subsystem, at least one proposed schedule for the showing within the particular time frame based on the first client account data, the second client account data, the third client account data, the first listing data, and the second listing data.

As another example, an online scheduling service subsystem in communication with a first client device subsystem of a first client entity associated with a first construct, a second client device subsystem of a second client entity associated with a second construct, and a third client device subsystem of a third client entity in a system may be provided, where the online scheduling service subsystem includes at least one processor component, at least one memory component, and at least one communications component, wherein the online scheduling service subsystem is operative to receive first client account data associated with the first client entity from the first client device via the at least one communications component, create a first client account with the first client account data received from the first client device using the at least one processor component, receive second client account data associated with the second client entity from the second client device via the at least one communications component, create a second client account with the second client account data received from the second client device using the at least one processor component, receive third client account data associated with the third client entity from the third client device via the at least one communications component, create a third client account with the third client account data received from the third client device using the at least one processor component, access first listing data associated with the first construct, create a first listing that includes the first listing data using the at least one processor component, access second listing data associated with the second construct, create a second listing that includes the second listing data using the at least one processor component, receive a request from the third client account to schedule a showing that includes a first appointment for the third client entity and the first client entity at the first construct and a second appointment for the third client entity and the second client entity at the second construct, and, in response to receiving the request, generate at least one proposed schedule for the showing using the at least one processor component based on the first client account data of the first client account, the second client account data of the second client account, the third client account data of the third client account, the first listing data of the first listing, and the second listing data of the second listing.

As another example, a non-transitory computer-readable storage medium storing at least one program may be provided, where the at least one program includes instructions, which, when executed by at least one processor of an online scheduling service subsystem, cause the at least one processor to access first client account data associated with a first client entity, access first listing data associated with a first construct, access second client account data associated with a second client entity, access second listing data associated with a second construct, access third client account data associated with a third client entity, detect a request to schedule a showing within a particular time frame, wherein the showing includes a first appointment for the third client entity and the first client entity with the first construct and a second appointment for the third client entity and the second client entity with the second construct, and, in response to detecting the request, generate at least one proposed schedule for the showing within the particular time frame based on the first client account data, the second client account data, the third client account data, the first listing data, and the second listing data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1A is a more detailed schematic view of a subsystem of the system of FIG. 1;

FIGS. 3-31 are illustrative screenshots of user interfaces of one or more client device subsystems of one or more of FIGS. 1 and 1A illustrating an exemplary online presentation of the scheduling service of the disclosure.

DETAILED DESCRIPTION OF THE DISCLOSURE

Figure 1:
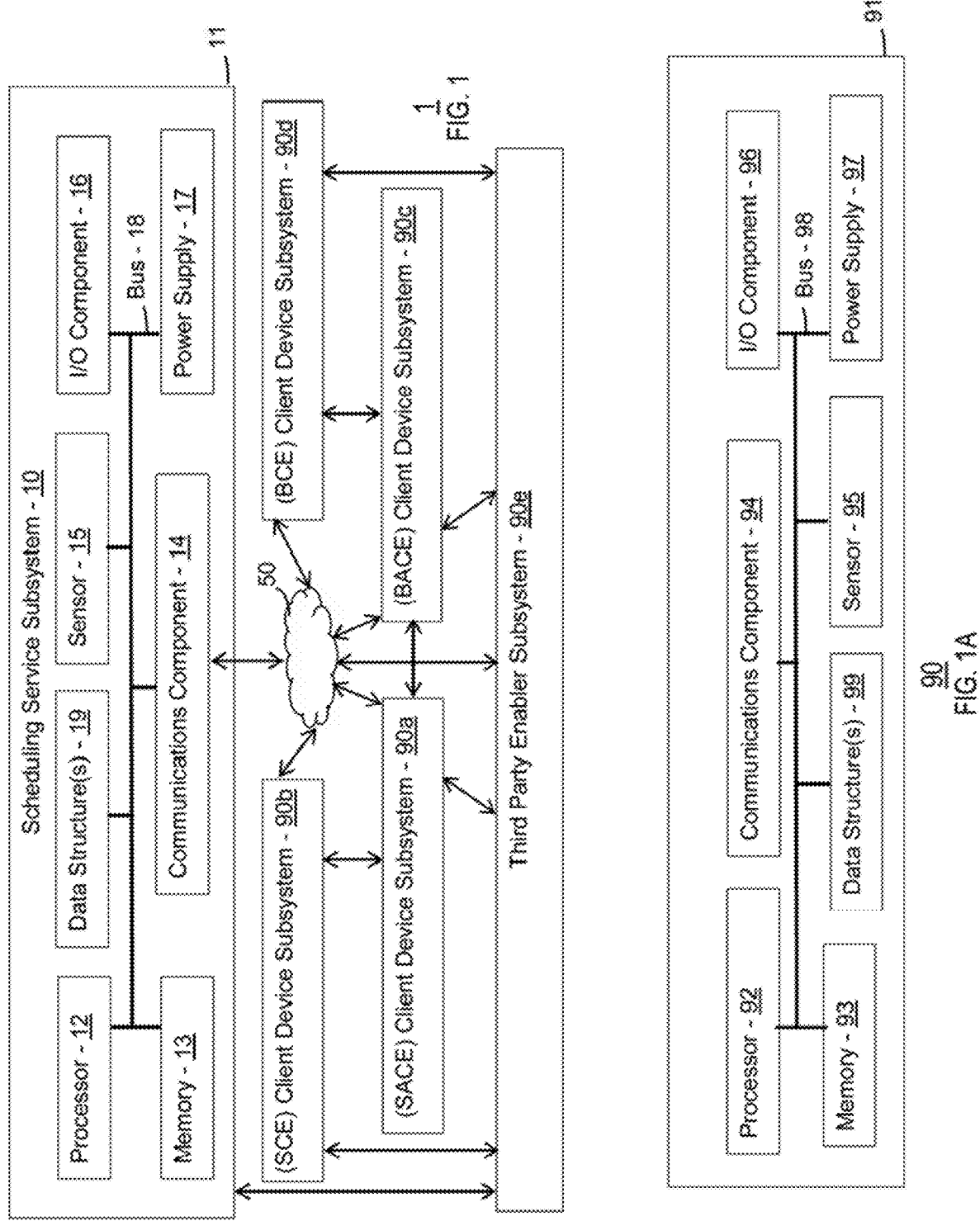
FIG. 1 is a schematic view of an illustrative system that may provide a scheduling service of the disclosure.

This disclosure may relate to systems, methods, and computer-readable media for a scheduling service that may be operative to optimize the scheduling of activities for one, some, or all suitable parties (e.g., client entities) involved in any suitable transaction (e.g., a real estate transaction, a business meeting, etc.), including, but not limited to, a buyer, a seller, an agent for the buyer, an agent for the seller, business professionals (e.g., appraisers, financial advisors, and any other suitable client facing professionals), and the like. Scheduling information may be presented to users in the context of an application software interface (e.g., a native "app") installed on mobile or desktop computing devices or in the context of a responsive website interface or web app accessible via the internet by mobile or desktop computing devices. These various application interfaces may provide a program for managing and tracking appointment activities related to any suitable transactions, such as real estate acquisition transactions (e.g., rentals, sublets, purchases, etc.), real estate appraisal transactions, real estate title closing transactions, inspection transactions, financial planning and/or wealth management transactions, logistic fulfillment transactions, any suitable meetings or business transactions (e.g., physical and/or virtual meetings), and/or the like. While portions of this disclosure may make reference to a real estate transaction, it is to be understood that one, some, or each concept described herein may be applicable to any other suitable transaction for any other suitable construct other than real estate, such as an automobile or other physical object, and/or intellectual construct such as an idea that is to be discussed or otherwise shared in a transaction (e.g., in a virtual or physical meeting).

There may be two sides to each real estate transaction, such as the seller's side and the buyer's side. Each side may have its own real estate agent that may help it with its transaction. When a buyer's agent identifies potential properties that its buyer might be interested in (e.g., through internet searches or any other suitable manner), the buyer's agent (e.g., showing agent) may contact the buyer to find out about its scheduling availability to see the identified potential properties. Then the buyer's agent may communicate with the seller's agent (e.g., listing agent) for a particular identified property to see if the property is available to show during those times that worked for the buyer. Then, the seller's agent may contact the seller to see if the property is available to show during the requested time and respond back to the buyer's agent. The buyer's agent may then reach out to multiple additional listing agents for different properties to view during a single meeting with the buyer during or around the same time that the buyer's agent and the buyer are to see the first property of the previously mentioned seller. Based on the time availability of the two or more properties, of the one or more sellers of the two or more properties, of the one or more agents of the one or more sellers of the two or more properties, of the buyer, and/or of the agent of the buyer, there may be multiple iterations of communication amongst the different parties to enable the buyer's agent or the buyer to schedule one or more appointments for one or more properties during a single meeting with the buyer (e.g., a single time frame on the same day or consecutive days). The challenges of such scheduling may also apply to appraisers, mortgage closers, inspectors, financial advisors, sales representatives, or any other professional that may have a job based on scheduling appointments with different clients at different locations to which the professional has to travel. There may be a lot of inefficiency created by the constant back and forth communications between different parties about the availability of each party, which may make it especially tedious and non-value added work for the showing agent (e.g., the buyer's agent) that may be trying to maximize his time by showing multiple properties during one meeting with his client (e.g., the buyer). Also, for the business professional that may be trying to maximize its number of client visits to fill up its entire day with appointments, this could prove especially laborious. There needs to be a simpler way to optimize and automate the scheduling of appointments, minimize the unnecessary communications between the parties, and maximize the number of appointments that can be scheduled by the showing agent based on the locations of different properties or showings or appointments.

As a result, this disclosure describes systems, methods, and computer-readable media to optimize and/or automate the process of scheduling appointments, such as showing agents' appointments with their clients and the listing agents. Such scheduling may be automated amongst the different parties based on user preferences and each party's time availability. Such a scheduling service may use one or more algorithms configured to optimize the scheduling, time, and travel (e.g., driving) distance between showings for multiple locations. In addition, such a service may help the agents and business professionals to have visibility to their clients' time availability. Based on the user's preferences with specific criteria, the business professional can automate the process of selecting which clients to see based on time availability of the professional, clients, and locations of the clients.

A scheduling service is provided that may be operative to enable two or more parties privy to one or more appointments (e.g., for potential transaction(s) of any suitable construct(s) or any suitable event(s)) to schedule a time for such appointment(s) in an effective and/or efficient manner.

Figure 2:
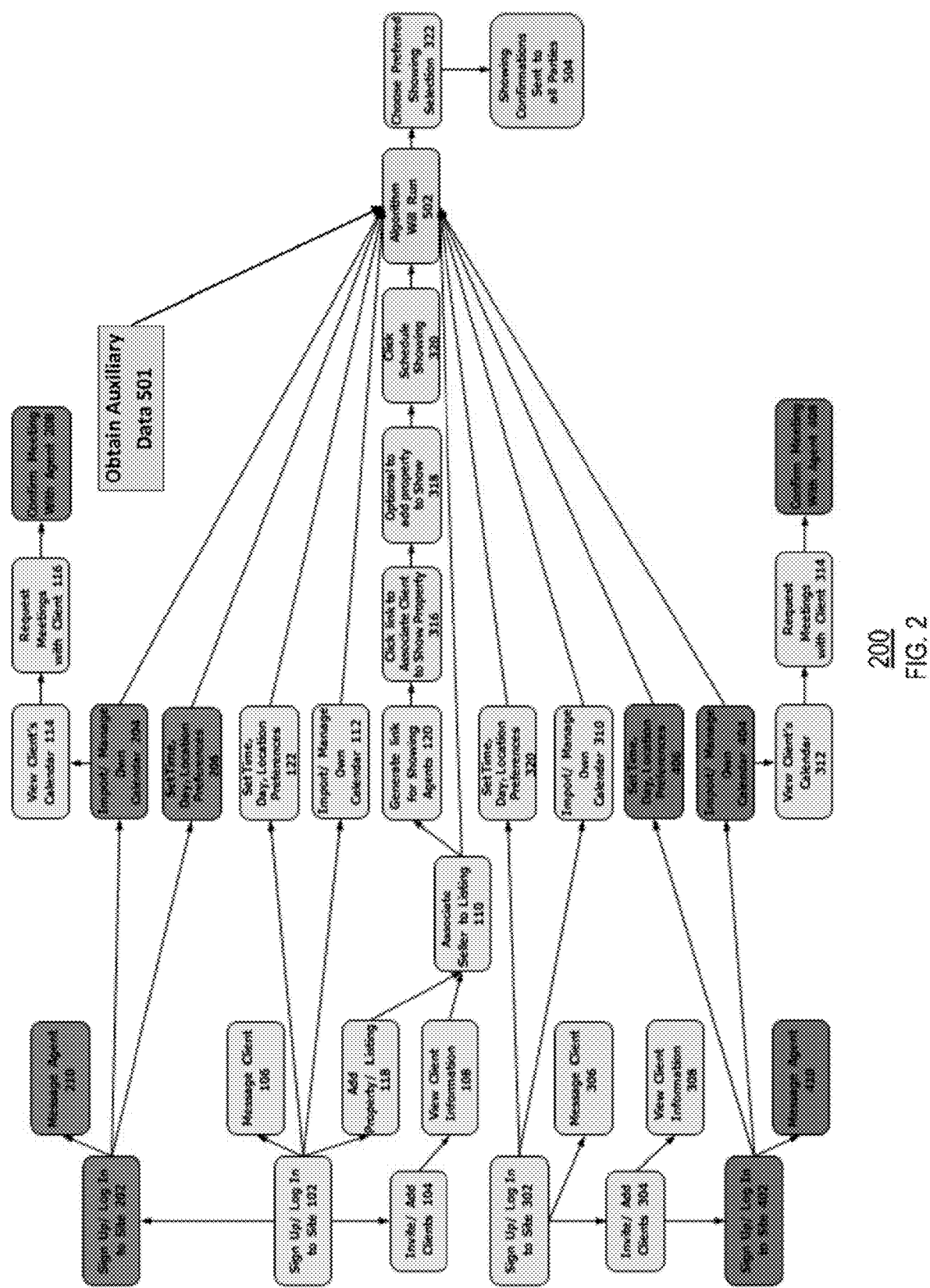
FIG. 2 is a flowchart of an illustrative process that may provide features of the scheduling service of the disclosure.
Figure 3:
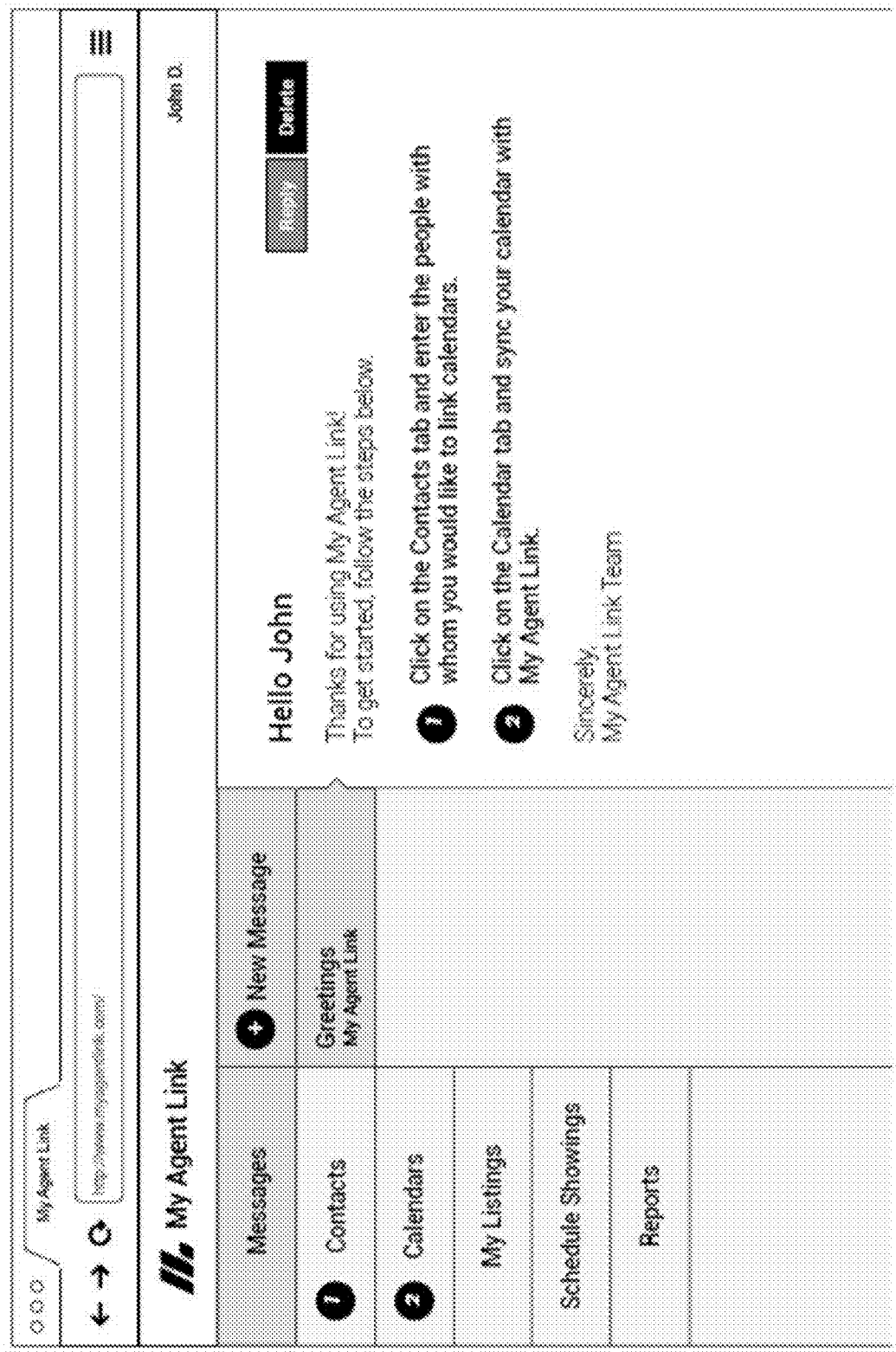
Figure 31:
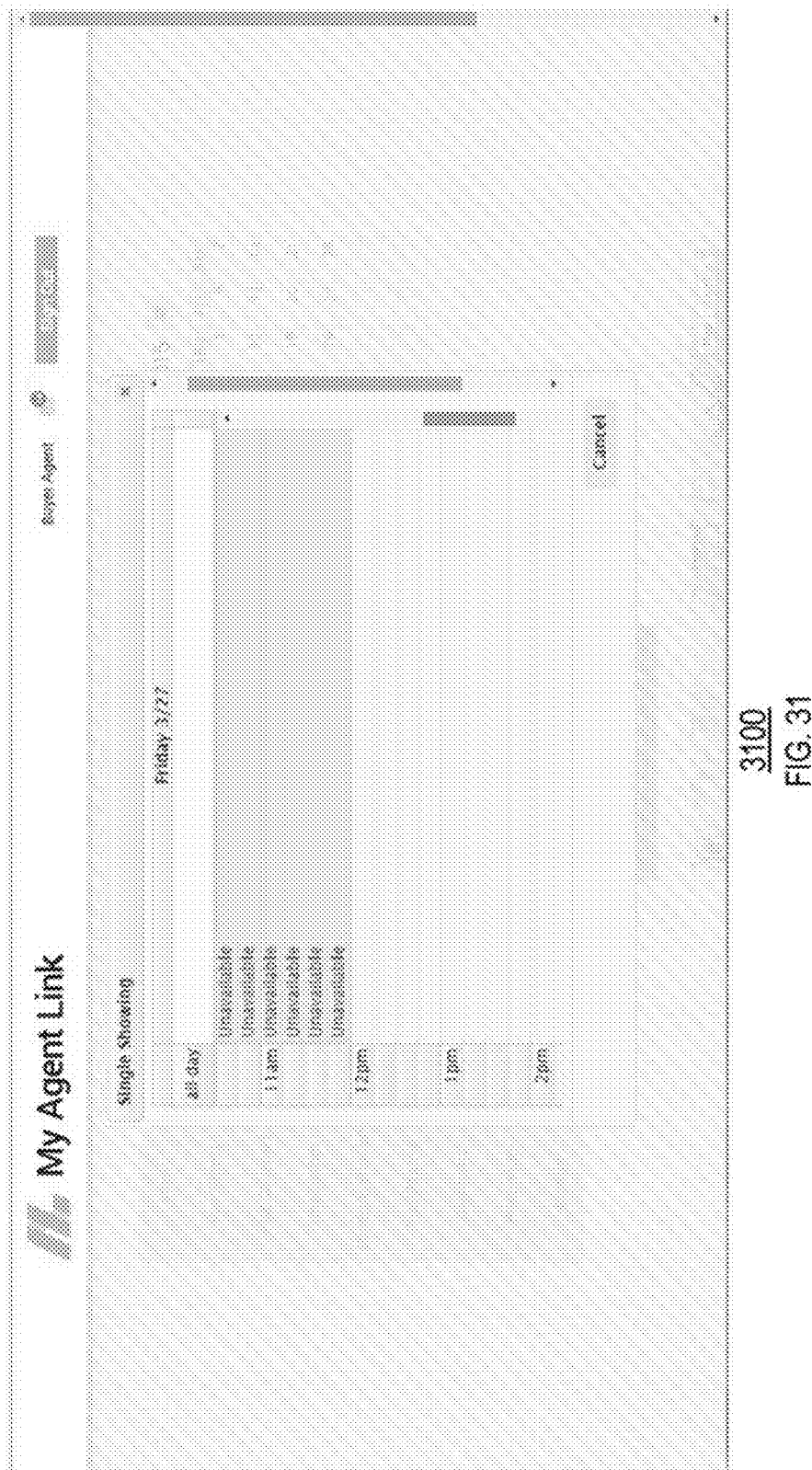
Figure 32:
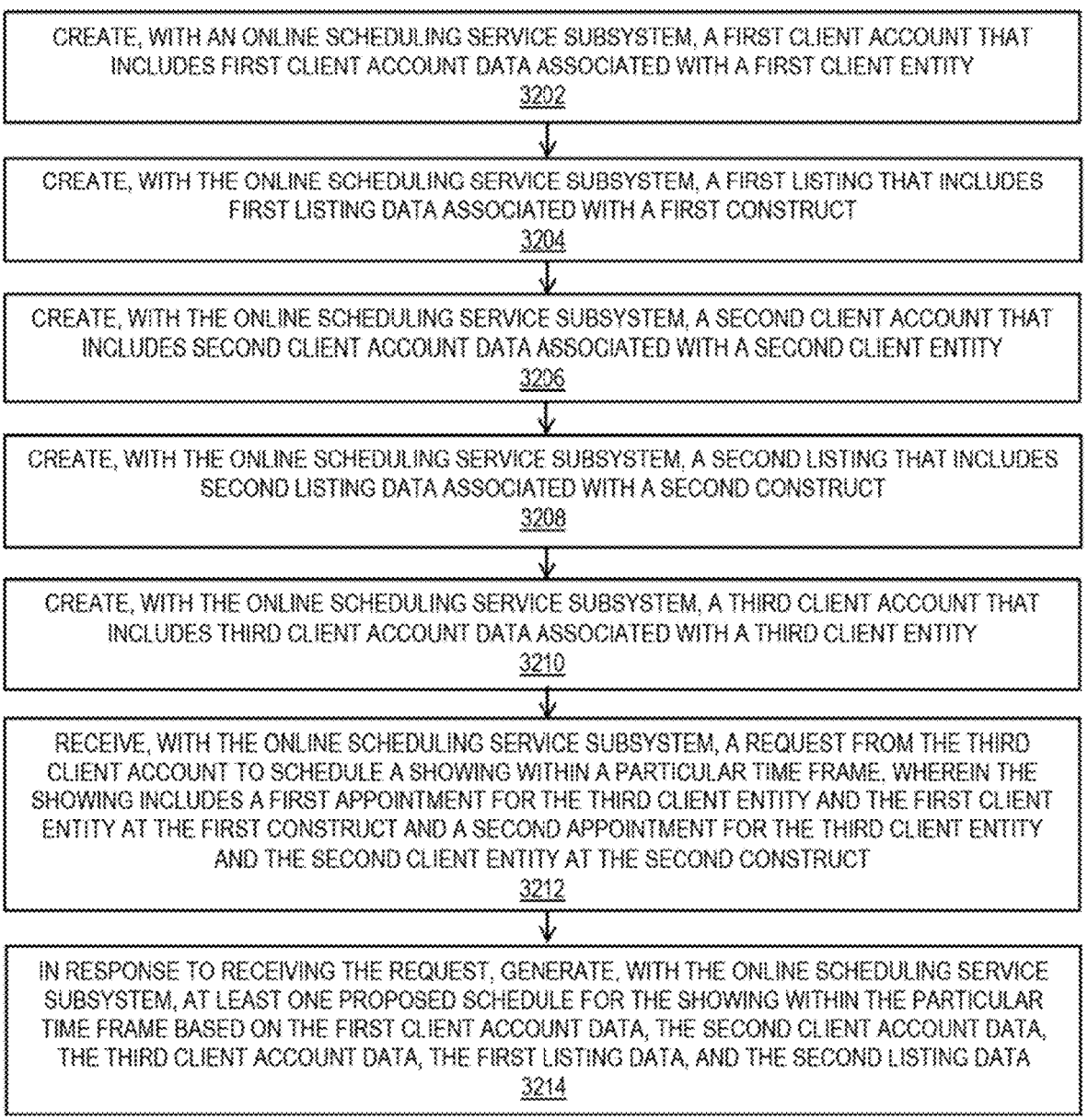
FIGS. 32 and 33 are flowcharts of illustrative processes that may provide features of the scheduling service of the disclosure.
Figure 33:
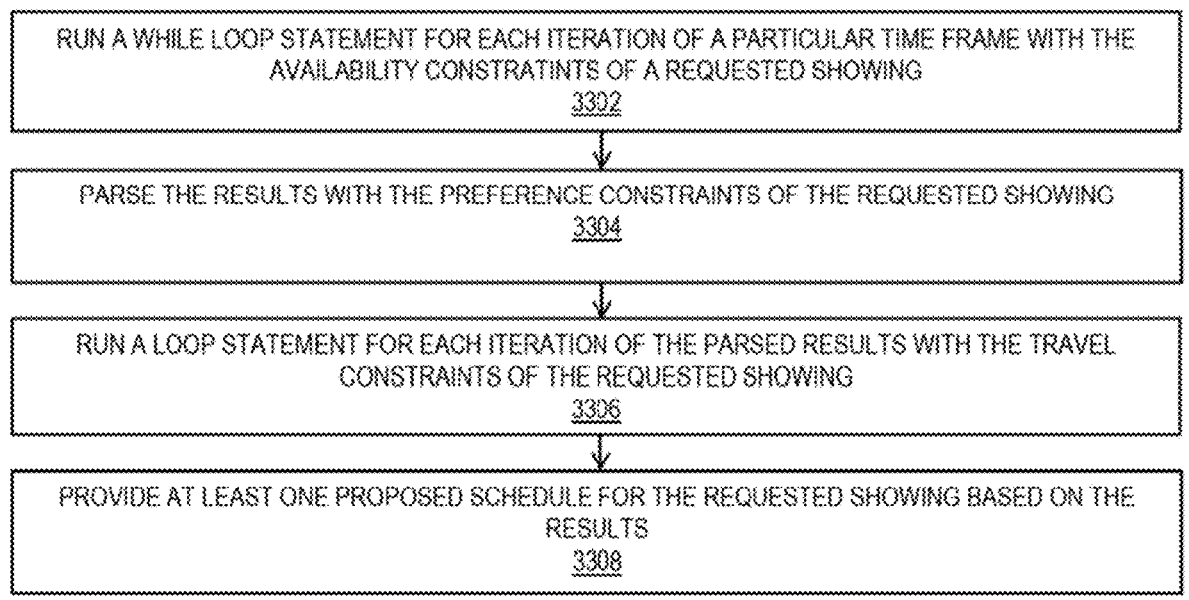

FIG. 1 shows a system 1 in which a scheduling service may be facilitated amongst various entities, FIG. 1A shows further details with respect to a particular embodiment of a subsystem of system 1, FIGS. 2, 32, and 33 are flowcharts of illustrative processes for using the scheduling service, and FIGS. 3-31 are illustrative screenshots of user interfaces of a client device subsystem of one or more of FIGS. 1 and 1A illustrating an exemplary online presentation of the scheduling service of the disclosure.

FIG. 1 is a schematic view of an illustrative system 1 in which a scheduling service may be facilitated amongst various entities. For example, as shown in FIG. 1, system 1 may include a scheduling service ("SS") subsystem 10, various other subsystems 90 (e.g., one or more client device ("CD") subsystems, such as CD subsystems 90a-90d, one or more third party enabler ("TPE") subsystems, such as TPE subsystem 90e, and/or the like), and a communications network 50 through which any two or more subsystems of system 1 may communicate. SS subsystem 10 and at least one subsystem 90 may communicate. SS subsystem 10 may be operative to interact with any of the various subsystems 90 to provide a scheduling service platform ("SSP"), such as an online scheduling service platform provided by SS subsystem 10, that may facilitate various scheduling services, including, but not limited to, scheduling one or more appointments between two or more parties in an effective and/or efficient manner.

As shown in FIG. 1A, and as described in more detail below, a subsystem 90 may include a processor component 92, a memory component 93, a communications component 94, a sensor component 95, an input/output ("I/O") component 96, a power supply component 97, and/or a bus 98 that may provide one or more wired or wireless communication links or paths for transferring data and/or power to, from, or between various other components of subsystem 90. I/O component 96 may include at least one input component (e.g., a button, mouse, keyboard, microphone, etc.) to receive information from a user of subsystem 90 and/or at least one output component (e.g., an audio speaker, video display, haptic component, etc.) to provide information to a user of subsystem 90, such as a touch screen that may receive input information through a user's touch on a touch sensitive portion of a display screen and that may also provide visual information to a user via that same display screen. Memory 93 may include one or more storage mediums, including for example, a hard drive, flash memory, permanent memory such as read only memory ("ROM"), semi-permanent memory such as random access memory ("RAM"), any other suitable type of storage component, or any combination thereof. Communications component 94 may be provided to allow one subsystem 90 to communicate with a communications component of one or more other subsystems 90 or subsystem 10 or servers using any suitable communications protocol (e.g., via communications network 50). Communications component 94 can be operative to create or connect to a communications network for enabling such communication. Communications component 94 can provide wireless communications using any suitable short range or long range communications protocol, such as Wi Fi (e.g., an 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 94 can also be operative to connect to a wired communications network or directly to another data source wirelessly or via one or more wired connections or a combination thereof. Such communication may be over the internet or any suitable public and/or private network or combination of networks (e.g., one or more networks 50). Sensor 95 may be any suitable sensor that may be configured to sense any suitable data from an environment of subsystem 90 or internal to subsystem 90 (e.g., light data via a light sensor, audio data via an audio sensor, location based data via a location-based sensor (e.g., a global positioning system ("GPS")), etc.). Power supply 97 can include any suitable circuitry for receiving and/or generating power, and for providing such power to one or more of the other components of subsystem 90. Subsystem 90 may also be provided with a housing 91 that may at least partially enclose one or more of the components of subsystem 90 for protection from debris and other degrading forces external to subsystem 90. Each component of subsystem 90 may be included in the same housing 91 (e.g., as a single unitary device, such as a laptop computer or portable media device) and/or different components may be provided in different housings (e.g., a keyboard input component may be provided in a first housing that may be communicatively coupled to a processor component and a display output component that may be provided in a second housing and/or multiple servers may be communicatively coupled to provide for a particular subsystem). In some embodiments, subsystem 90 may include other components not combined or included in those shown or several instances of the components shown.

Processor 92 may be used to run one or more applications, such as an application that may be provided as at least a portion of one data structure 99 that may be accessible from memory 93 and/or from any other suitable source (e.g., from SS subsystem 10 via an active internet connection). Such an application data structure 99 may include, but is not limited to, one or more operating system applications, firmware applications, communication applications, internet browsing applications (e.g., for interacting with a website provided by SS subsystem 10 for enabling subsystem 90 to interact with an online service of SS subsystem 10), scheduling service applications (e.g., a web application or a native application that may be at least partially produced by SS subsystem 10 for enabling subsystem 90 to interact with an online service), or any other suitable applications. For example, processor 92 may load an application data structure 99 as a user interface program to determine how instructions or data received via an input component of I/O component 96 or via communications component 94 or via sensor component 95 or via any other component of subsystem 90 may manipulate the way in which information may be stored and/or provided to a user via an output component of I/O component 96 and/or to any other subsystem via communications component 94. As one example, an application data structure 99 may provide a user with the ability to interact with a scheduling service or the SSP of SS subsystem 10, where such application 99 may be a third party application that may be running on subsystem 90 (e.g., an application associated with SS subsystem 10 that may be loaded on subsystem 90 from SS subsystem 10 and/or via an application market (e.g., the Apple App Store or Google Play)) and/or that may be accessed via an internet application or web browser (e.g., by Apple Safari or Google Chrome) running on subsystem 90 (e.g., processor 92) that may be pointed to a uniform resource locator ("URL") whose target or web resource may be managed by SS subsystem 10 or any other remote subsystem. Application 99 may be accessible to processor 92 from any suitable source at any suitable time, such as from memory 93 local to subsystem 90 or via the cloud (e.g., another server or subsystem via network 50) or otherwise. Each subsystem 90 may be a portable media device (e.g., a smartphone), a laptop computer, a tablet computer, a desktop computer, an appliance, a wearable electronic device, at least one web or network server (e.g., for providing an online resource, such as a website or native online application, for presentation on one or more other subsystems) with an interface for an administrator of such a server, and/or the like.

SS subsystem 10 may include a housing 11 that may be similar to housing 91, a processor component 12 that may be similar to processor 92, a memory component 13 that may be similar to memory component 93, a communications component 14 that may be similar to communications component 94, a sensor component 15 that may be similar to sensor component 95, an I/O component 16 that may be similar to I/O component 96, a power supply component 17 that may be similar to power supply component 97, and/or a bus 18 that may be similar to bus 98. Moreover, SS subsystem 10 may include one or more data sources or data structures or applications 19 that may include any suitable data or one or more applications (e.g., any application similar to application 99) for facilitating a scheduling service ("SS") or SSP that may be provided by SS subsystem 10 to one or more subsystems 90. Some or all portions of SS subsystem 10 may be operated, managed, or otherwise at least partially controlled by an entity responsible for providing a scheduling service to one or more clients or other suitable entities.

SS subsystem 10 may communicate with one or more subsystems 90 via communications network 50. Network 50 may be the internet or any other suitable network, such that when intercoupled via network 50, any two subsystems of system 1 may be operative to communicate with one another (e.g., a subsystem 90 may access information (e.g., from a data structure 19 of SS subsystem 10, as may be provided as a scheduling service via processor 12 and communications component 14 of SS subsystem 10) as if such information were stored locally at that subsystem 90 (e.g., in memory component 93).

Various clients and/or partners may be enabled to interact with SS subsystem 10 for enabling the scheduling services of the SSP. For example, two or more client device subsystems of system 1 (e.g., each one of the two or more client device subsystems 90*a*-90*d*) may be operated by any suitable client entity ("CE") that may be any suitable party to a scheduled appointment. For example, in some embodiments, when an appointment is related to the showing of any suitable owned property (e.g., real estate property) for the prospect selling that property, two or more suitable client entities may be privy to the appointment scheduling, including, but not limited to, two or more of a seller's agent client entity ("SACE") or a listing agent CE that may be associated with or otherwise use SACE client device subsystem 90*a*, a seller client entity ("SCE") that may be associated with or otherwise use SCE client device subsystem 90*b*, a buyer's agent client entity ("BACE") that may be associated with or otherwise use BACE client device subsystem 90*c*, and/or a buyer client entity ("BCE") that may be associated with or otherwise use BCE client device subsystem 90*d*. Any suitable group of two or more suitable client entities of any suitable type may be associated with any group of client device subsystems of system 1. Additionally or alternatively, at least one third party enabler subsystem of system 1 (e.g., third party enabler subsystem 90*e*) may be operated by any suitable third party enabler ("TPE") that may be operative to enable at least partially any suitable operation provided by the SSP, such as a third party application that may be operative to process or generate or share any suitable data that may be associated with any suitable characteristic of a party or of a construct for which one or more appointments is to be scheduled, such as a calendar application (e.g., iCal by Apple Inc.), a traffic application (e.g., Waze by Google Inc.), a mapping application (e.g., Google Maps by Google Inc.), a drone sharing application, a social network application (e.g., Facebook by Facebook, Inc.), a real estate application (e.g., Zillow by the Zillow Group) or any other suitable real estate multiple listings service (e.g., the New Jersey Multiple Listing Service ("NJMLS")), and/or the like, from which data may be obtained and used by SP subsystem 10 (e.g., as auxiliary data at step 501 of process 200) and/or to which data may be shared by SP subsystem 10 (e.g., as link data at step 120 of process 200), although it is to be understood that one, some or all of the processes and/or deliverables that may be at least partially enabled by one or more third party enablers may instead be enabled entirely by SS subsystem 10 of the SSP.

Each subsystem 90 of system 1 (e.g., each one of subsystems 90*a*-90*e*) may be operated by any suitable entity for interacting in any suitable way with SS subsystem 10 (e.g., via network 50) for deriving value from and/or adding value to a service of the SSP of SS subsystem 10. For example, a particular subsystem 90 may be a server operated by a client/partner entity that may receive any suitable data from SS subsystem 10 related to any suitable scheduling service of the SSP provided by SS subsystem 10 (e.g., via network 50). Additionally, or alternatively, a particular subsystem 90 may be a server operated by a client/partner entity that may upload or otherwise provide any suitable data to SS subsystem 10 related to any suitable scheduling service of the SSP provided by SS subsystem 10 (e.g., via network 50).

To facilitate the following discussion regarding the operation of system 1 for providing a scheduling service ("SS") with SS subsystem 10 in conjunction with one or more subsystems 90, reference is made to one or more processes (e.g., process 200 of FIG. 2 and/or process 3200 of FIG. 32 and/or process 3300 of FIG. 33), to various components of system 1 of the schematic diagrams of FIGS. 1 and 1A, and to front views of screens 300-3100 of respective FIGS. 3-31 that may be representative of a graphical user interface of one or more subsystems 90 during use of such a scheduling service (e.g., a UI that may be provided via an I/O component 96 of subsystem 90 to a user). The operations described may be achieved with a wide variety of graphical elements and visual schemes. Therefore, the embodiments of FIGS. 3-31 are not intended to be limited to the precise user interface conventions adopted herein. Rather, embodiments may include a wide variety of user interface styles and options. While the term "My Agent Link" may be used herein to refer to the SSP of SS subsystem 10, it is to be understood that any suitable name or group of suitable names may be interchangeable used to denote the SSP of SS subsystem 10 (e.g., to a user of one or more client or TPE subsystems of system 1). Moreover, although one or more of the UIs of screens 300-3100 of FIGS. 3-31 (e.g., the screens of FIGS. 3-17 and 20-22) may be shown as UIs of an internet browsing application (e.g., when interacting with a website provided by SS subsystem 10 for enabling subsystem 90 to interact with an online service of SS subsystem 10), each UI of FIGS. 3-31 may be provided as a UI of any suitable online resource that may be accessed by a subsystem 90 for enabling subsystem 90 to interact with an online service of SS subsystem 10 (e.g., a web application or a native application that may be at least partially produced by SS subsystem 10 for enabling subsystem 90 to interact with an online service).

At step 102 of process 200, a seller's agent client entity (e.g., listing agent) may log in to an existing client entity account or sign up for a new client entity account for the service on the SSP (e.g., using a seller's agent client subsystem 90*a*). After step 102, the seller's agent client entity ("SACE") may access (e.g., at welcome screen 300 of FIG. 3), using the SACE account of the SSP, a contacts tab or other suitable interface that may be utilized to invite one or more other client entities to create an account on the SSP and/or to add an existing account of one or more other client entities to a group of one or more entities of interest to that SACE at step 104, such as a client of the SACE or a seller client entity ("SCE"), which may enable the SACE to gain access to data of and/or communicate with the account of each such other client entity (e.g., via the SSP using any suitable communications mechanism) at step 106 and/or to add and/or view information of the account of each such other client entity as a contact on the SSP at step 108 (e.g., at one or more of screens 400-600 of FIGS. 4-6, which may be exemplary contact screens once an agent or other professional may have added a client/contact to its profile, where the contact may be added as a new account to the SSP via an electronic invite, in some embodiments). In some embodiments, the SACE or any other suitable client entity can define (e.g., at step 118) and/or associate with itself or with an SSP contact (e.g., at step 110) at least one SSP listing of a property or location or any other suitable construct (e.g., at one or more of screens 500 and 600 of FIGS. 5 and 6 and/or screens 1500-1700 of FIGS. 15-17). This may enable an agent to associate the availability of a client with the client's property or other construct listing for the scheduling optimization process that may occur later. For example, screen 300 may be a contacts tab or page that may enable a user to add or search for another user of the SSP as a contact of the user. Screen 400 may be an "add contact" screen that may enable a user to enter information associated with another entity to be added as a new user of the SSP or to be identified as an existing user for identifying as a contact to be associated with the user interfacing with screen 400. Screen 500 may be a "contact added" screen that may present information associated with another user to a user of screen 500 as a contact, which may be edited or deleted by the user and/or which may be associated with one or more particular listings by the user. Screen 600 may be an "added listing" screen that may be indicative of a contact once such a listing has been associated therewith. The SACE may sync or import (e.g., from another application of the SACE device subsystem 90*a* or from data of TPE subsystem 90*e* associated with the SACE) or otherwise manage its personal calendar or manage its meetings or appointments directly using the SSP at step 112 (e.g., at one or more of screens 700-1000 of FIGS. 7-10). For example, screen 700 may be a "calendar" screen that may enable a user to add a new calendar or synch or otherwise import calendar data of a calendar of past, present, and/or future planned events of a client entity user from a source available to SS subsystem 10 (e.g., a calendar from a TPE subsystem 90*e* (e.g., iCal by Apple Inc. or Google Calendar by Google Inc.) that may be accessed by the SSP through use of log-in credentials to that TPE subsystem provided by the user to the SSP). Screen 800 may be a "synched calendar" screen that may show one or more calendar events of the synched calendar in a first view (e.g., monthly) and screen 900 may be a "synched calendar" screen that may show one or more calendar events of the synched calendar in a second view (e.g., weekly) and screen 1000 may be a "synched calendar" screen that may show one or more calendar events of the synched calendar in a third view (e.g., daily).

Figure 19:
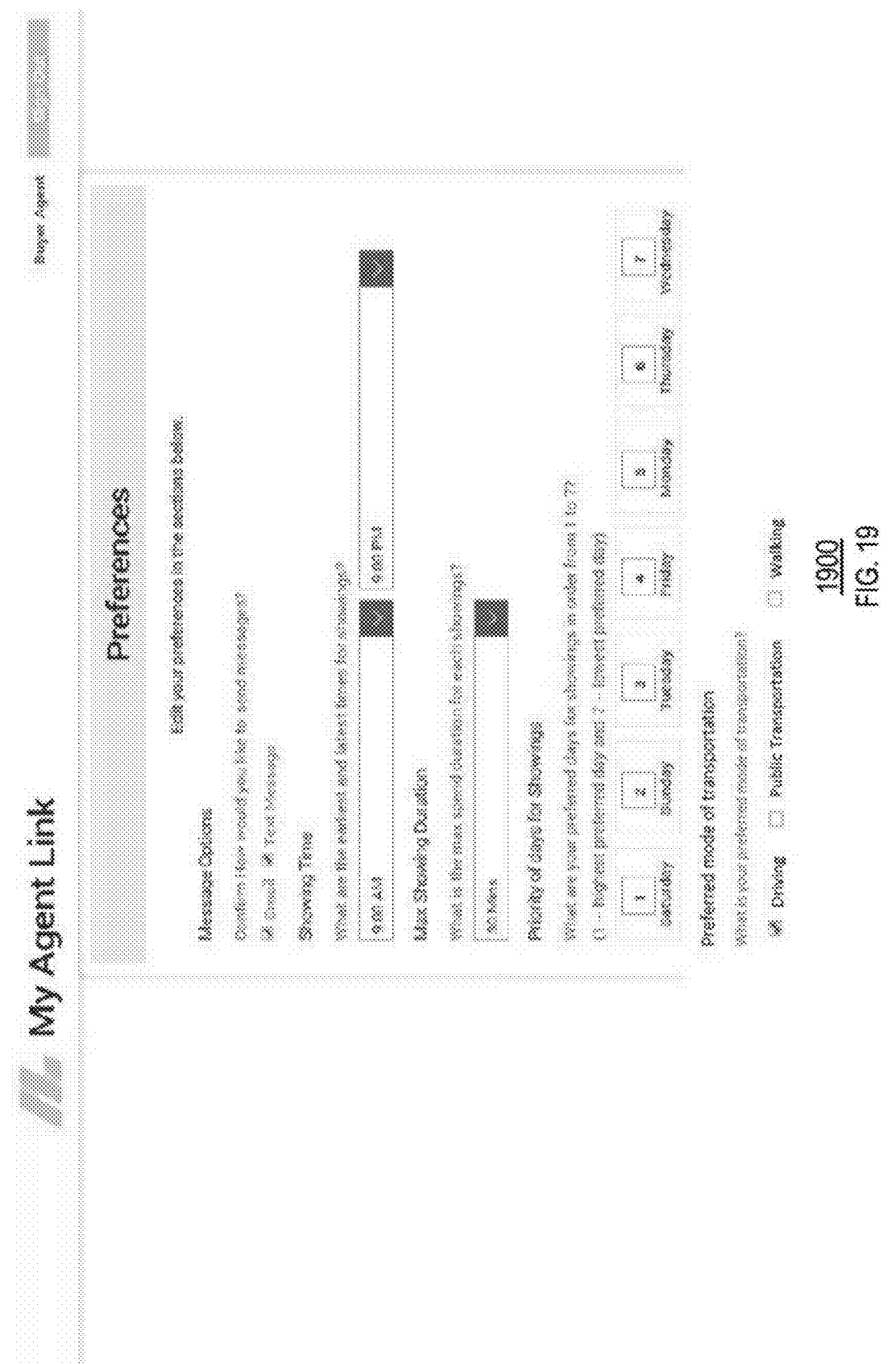

The SACE may also leverage a preferences functionality of the SSP for defining and/or editing any suitable preferences of the SACE with the SSP for any suitable purpose(s) at step 122, such as to set up a manner in which confirmation messages may be sent from and/or received by that client entity, to set up priority of days for appointments for that client entity, to set up earliest and latest available times for appointments for that client entity, potential location based GPS preferences of that client entity, preferred and/or available mode(s) of transportation of that client entity (e.g., automobile, public transportation, walking, etc.), and/or the like (e.g., at screen 1900 of FIG. 19). As shown in screen 2400 of FIG. 24, a current or future location may be provided by a client entity to the SSP (e.g., GPS data from a client device subsystem may be shared with the SSP). Current location information of a party or client entity may be accessible (e.g., as GPS data) from a client device subsystem of that client entity if such sharing is approved by the client entity (e.g., in preferences or in a user profile), while future and/or current location information of a party or client entity may be inferred or predicted or otherwise determined based on any suitable calendar data and/or preference data and/or user profile data of that client entity (e.g., user profile data may include any suitable address(es) of a client entity and the general times at which the client entity may be at each address (e.g., work address, Monday through Friday 9 am to 5 pm; home address all other times), calendar data may have specific locations associated with specific calendar events, preference data may suggest certain information associated with a future location of a client entity, etc.). The SSP may be operative to process any available data in any suitable way to make an optimal determination of a current and/or future location of a client entity (e.g., calendar data may be utilized or prioritized over general user profile data to determine a location). Client account data for any client entity of the SSP may include calendar data, user profile data, preference data, and/or any other suitable data. In some embodiments, a client entity may define different preferences for different listings with which that client entity may be associated (e.g., one or more client entities may be associated with one or more listings (e.g., as described with respect to step 110 and 118)). For example, an SACE may define first preferences with respect to a first listing and second preferences with respect to a second listing (e.g., a seller's agent may indicate that Saturdays are preferred over Fridays for showing a first listing but that Fridays are preferred over Saturdays for showing a second listing). Preferences of a client entity may vary by listing based on price or location or any other characteristic of the listing, day of potential appointment to be scheduled, and/or the like. In some embodiments, one or more preferences may be defined, similarly to step 122, for a particular listing rather than for a particular client entity. For example, when a listing is added to or edited on the SSP (e.g., at step 118), one or more preferences, including, but not limited to, any of the preferences mentioned above with respect to step 122, may be defined by any suitable party or automatically by the SSP for the listing. For example, like preferences of a particular client entity, preferences of a particular listing may also be defined in any suitable manner. For example, a listing preference may be defined to indicate that a listing prefers to be shown on Mondays more than Tuesdays, or in the afternoons more than in the mornings, and/or the like. Alternatively, a listing may be associated with one or more particular client entities (e.g., at step 110) such that the preference(s) or other suitable account data of the one or more client entities may be associated with and/or utilized as preferences or account data of the listing. Once a seller client entity ("SCE") (e.g., of the SACE) may login or sign up for an SCE account for the service on the SSP (e.g., based on an invitation from the SACE or on its own accord) at step 202 (e.g., using a SCE's client subsystem 90*b*), the SCE (e.g., client of the SACE) may also sync its personal calendar to manage its schedule on the SSP at step 204 (e.g., similar to step 112 by the SACE). The SCE may additionally or alternatively also leverage a preferences functionality of the SSP for any suitable purpose at step 206, such as to set up priority of days for showings, to set up earliest and latest available times for showings, potential location based GPS preferences, and/or the like for that SCE client entity generally and/or for that client entity with respect to one or more particular listings or types of listings (e.g., at screen 1900 of FIG. 19), where an SCE may have a first preference for a first type of listing or a first particular listing and a second preference for a second type of listing or a second particular listing (e.g., a client entity may define a preference of Fridays over Saturdays for appointments for real estate listings worth more than $1,000,000.00 and a preference of Saturdays over Fridays for appointments for real estate listings worth less than $1,000,000.00) (e.g., similar to step 122 by the SACE). After an SCE may set up a calendar and may grant permission to an SACE account to access the SCE account's calendar using the SSP, the SACE may be able to associate with this SCE client contact to view the SCE's availability under the SCE contact's calendar at step 114 (e.g., at one or more of screens 1100-1400 of FIGS. 11-14, which may show how the SSP may provide a calendar once a client has synced its calendar with an agent's calendar). Screen 1100 may be provided to an SACE when an SCE contact of that SACE has not synched its SCE calendar with that SACE (e.g., during or after step 204) and may allow the SACE to send an invite to that SCE to proceed with such synching. Screen 1200 may be provided to an SACE to present a synched calendar of an SCE contact of that SACE. Screen 1300 may be provided to an SACE to enable the SACE to send a meeting request (e.g., via the SSP) to the SCE for a particular time (e.g., based on the SACE's interaction with the SCE's synched calendar). Screen 1400 may be provided to an SACE to enable the SACE to identify a pending meeting request with an SCE (e.g., based on the SACE's interaction with the SCE's synched calendar). By enabling an agent to know a client's availability, the SSP may enable the seller's agent to schedule an appointment or meeting at step 116, where the client can quickly confirm (e.g., via email or text or any other suitable manner (e.g., via the SSP)) at step 208. The client can also message or otherwise communicate with the agent directly via the SSP with any comments or questions at step 210. At step 118, a new listing may be defined on the SSP by enabling the SSP to access any suitable information about the listing through any suitable manner, including, but not limited to, receiving data manually input from a seller or agent of a seller or any other entity associated with the listing, receiving data from any suitable accessible data source (e.g., real estate property data that may be publicly or otherwise accessible from any suitable data source, such as any suitable TPE subsystem 90*e* (e.g., Zillow.com)), and/or the like. For example, the seller's agent or a seller may sync a property address through a third party subsystem 90*e* of system 1 (e.g., a third party real estate website, etc.) or manually add in a property to the SSP directly at step 118 (e.g., at one or more of screens 1500-1700 of FIGS. 15-17, which may show how an SACE may interact with an SCE to add a property or other construct listing to the SSP and associate the listing with the SCE). Moreover, as mentioned, at step 110, such a listing may be associated with one or more specific client entity accounts of the SSP (e.g., a specific client or contact that may typically have ownership interest in that listing). Any suitable data may be used to define a listing, such as any suitable real estate characteristic information (e.g., address, price, square footage, type of property, number of bedrooms, number of bathrooms, etc.) and/or any listing preferences, such as day of showing preferences (e.g., a step similar to step 122 but with preferences for the listing rather than for a client entity may be included in process 200), and/or any calendar data (e.g., a calendar for a particular listing may be defined or otherwise associated with the listing on the SSP, where a step similar to step 112 but for a calendar of the listing rather than for a client entity may be included in process 200) and/or the like. In addition, once the listing is added, the SSP may generate a webpage link or other suitable object(s) for the SACE to post on any suitable website or online resource or e-mail or the like of any suitable third party (e.g., subsystem 90*e*) or on any suitable repository of listings that may be made available by the SSP for enabling (e.g., via an application program interface) other entities to schedule a showing or appointment for the property with the predefined availability of the SCE and/or the SACE at step 120 (e.g., at one or more of screens 1500-1700 of FIGS. 15-17). The SACE may post the link on a third party website (e.g., of subsystem 90*e*), such as a multiple listing service, a real estate office website, or a mobile application that markets real estate properties, or on any repository of the SSP. The link or the application program interface ("API") may show the availability of the property associated with the predefined availability of the SACE and the SCE to directly schedule a showing by a third party. The link or the API may be dynamic and may be updated in real time when there is a change made by the SCE or the SACE (e.g., via the SSP). A business professional may set up an API to its own website to have its potential clients sync up their calendar availability and location preferences, whereby the business professional may then schedule appointments automatically by running an algorithm based on the location of each client, their time availability, and the business professional's location and availability. Screen 1500 may be a "my listings" screen that may present one or more listings of an SACE or SCE to a user or may enable the user to add a new listing on the SSP (e.g., by adding any suitable information associated with a listing or property or other construct about which an appointment may be scheduled by the SSP). Screen 1600 may show a "listing added" screen when a new listing has been added and that may then be edited or deleted and/or that may have a contact (e.g., an SACE contact and/or an SCE contact) associated with the listing and/or that may present a link that may be copied or otherwise used by the user for sharing the listing in any suitable manner (e.g., via the SSP or TPE subsystem 90*e*) with any suitable entity. Screen 1700 may show a "contact added" screen when a contact (e.g., Mary Smith (e.g., an SCE associated with the SACE user)) has been added to a listing and that may then be edited or removed from the listing if desired.

Figure 4:
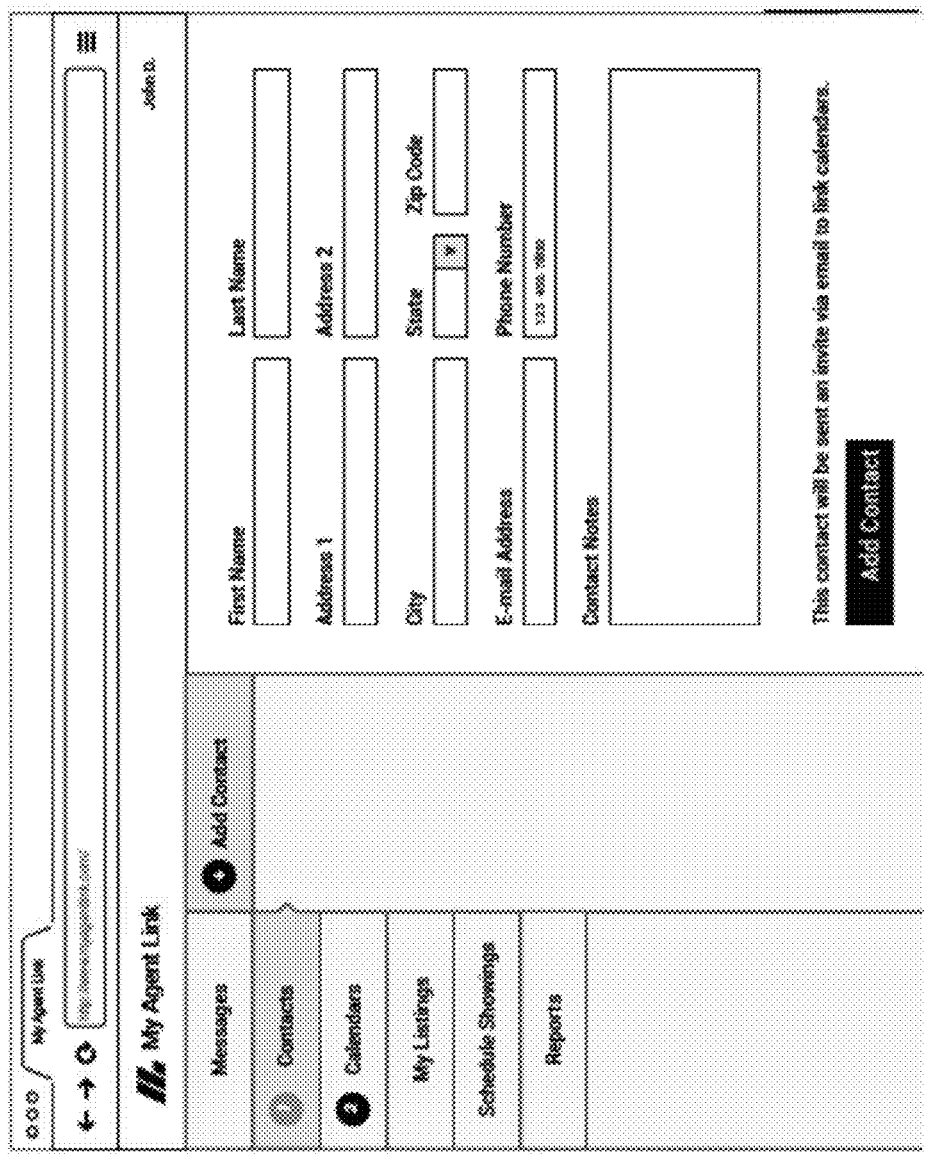
Figure 5:
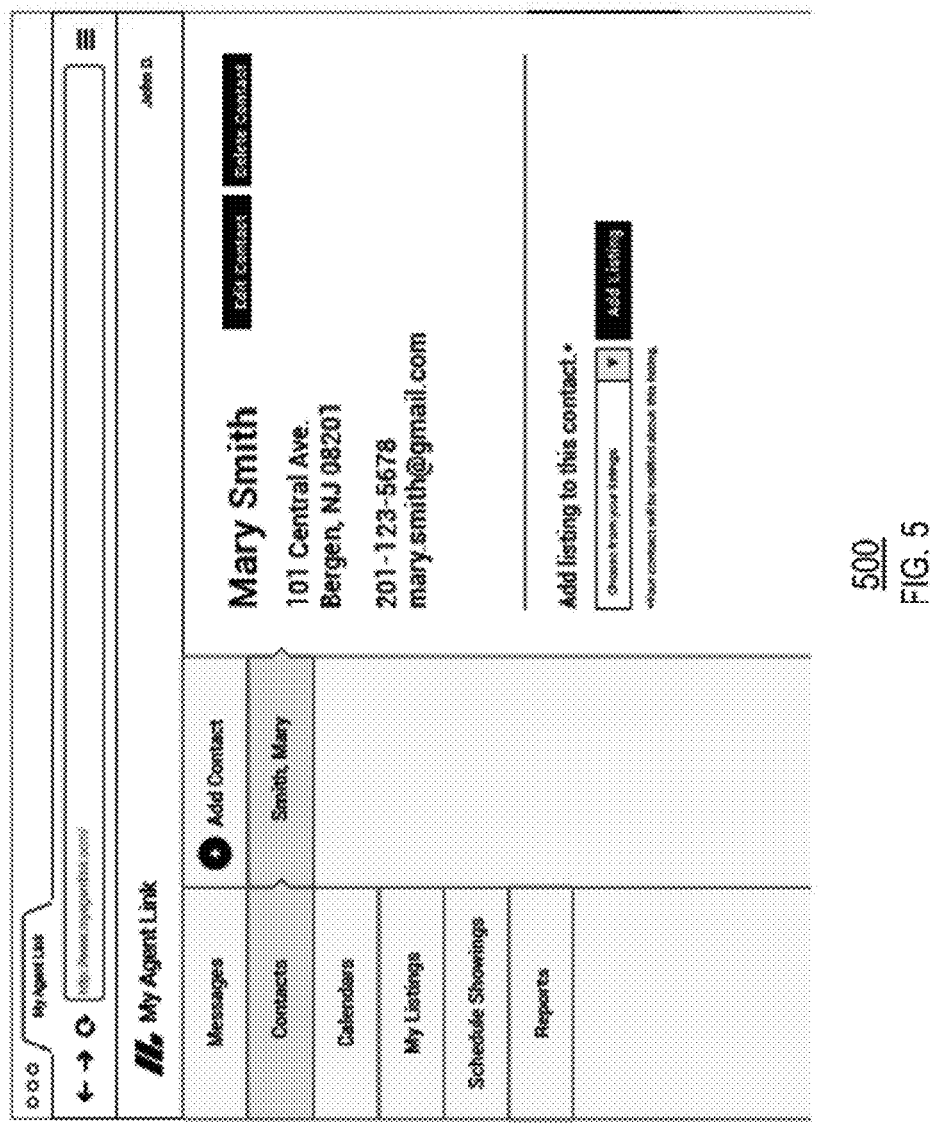
Figure 6:
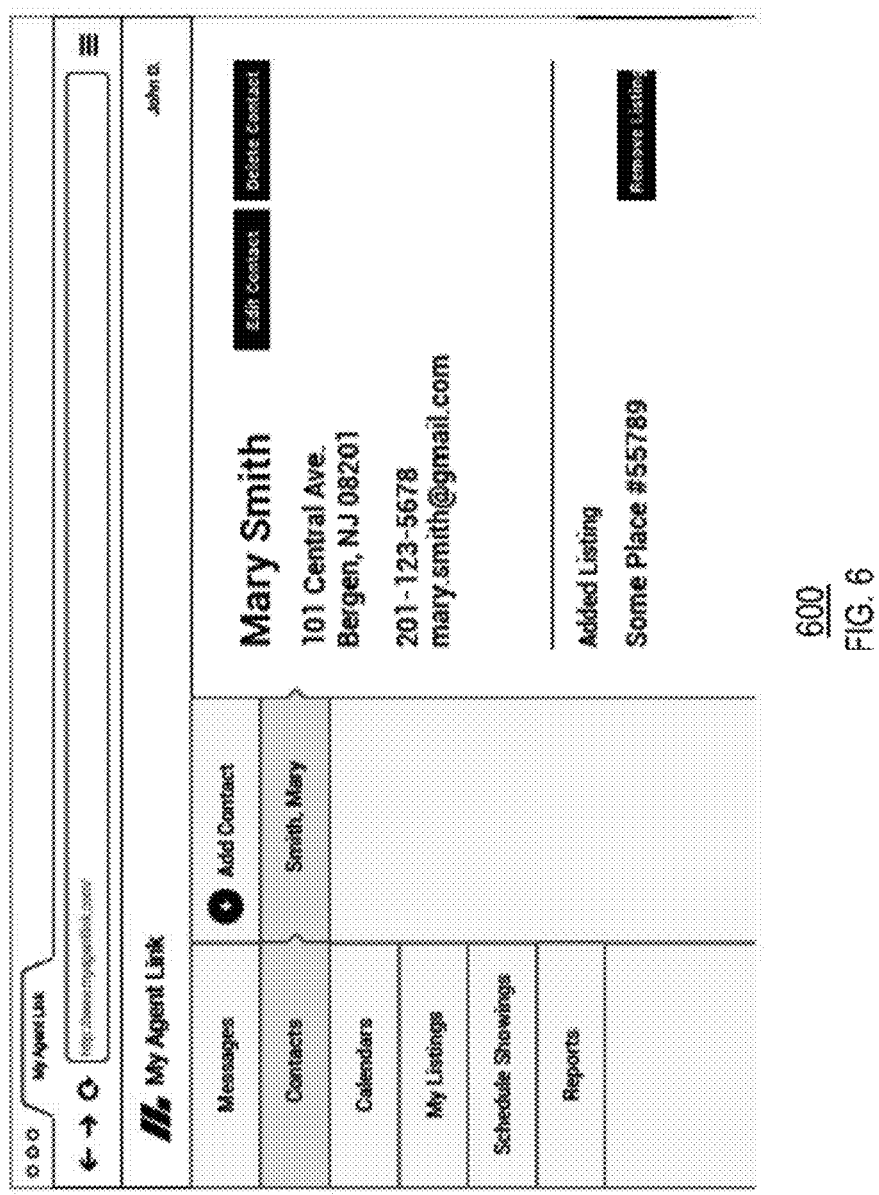
Figure 7:
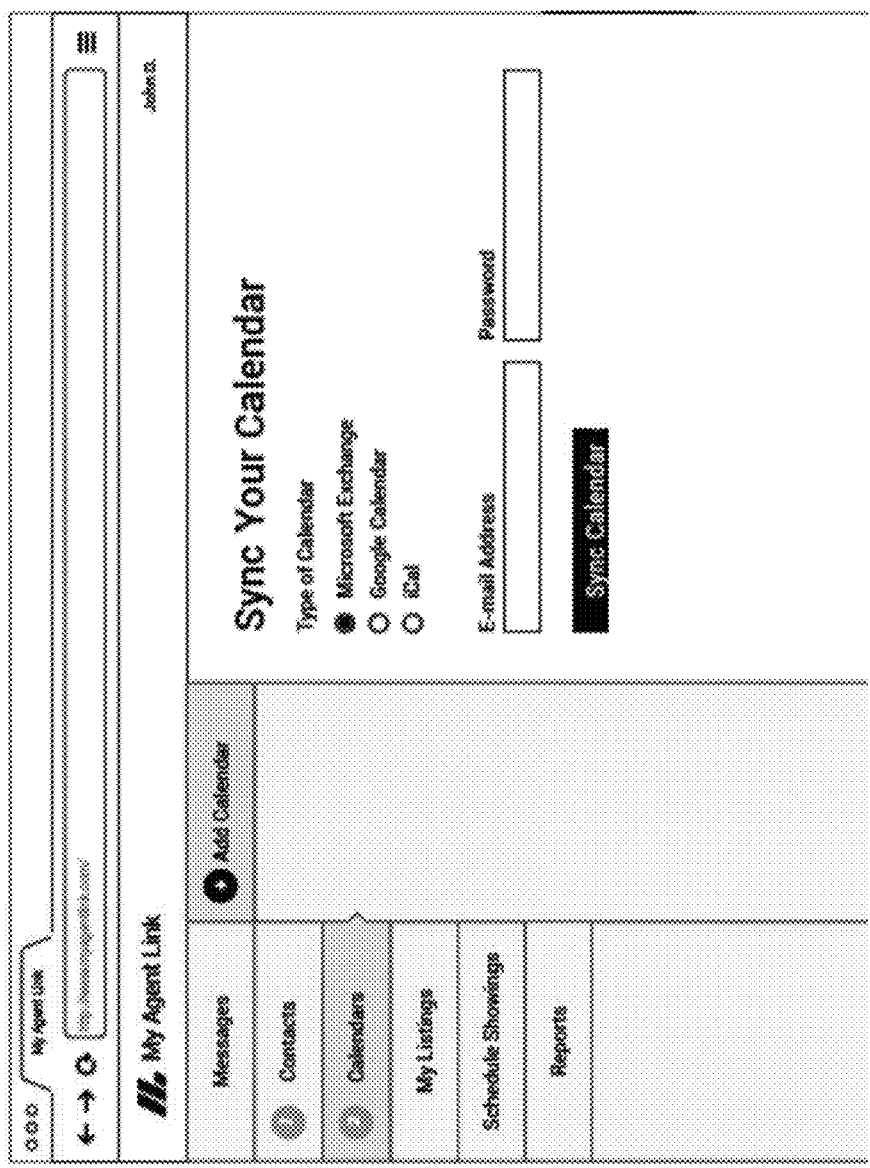
Figure 8:
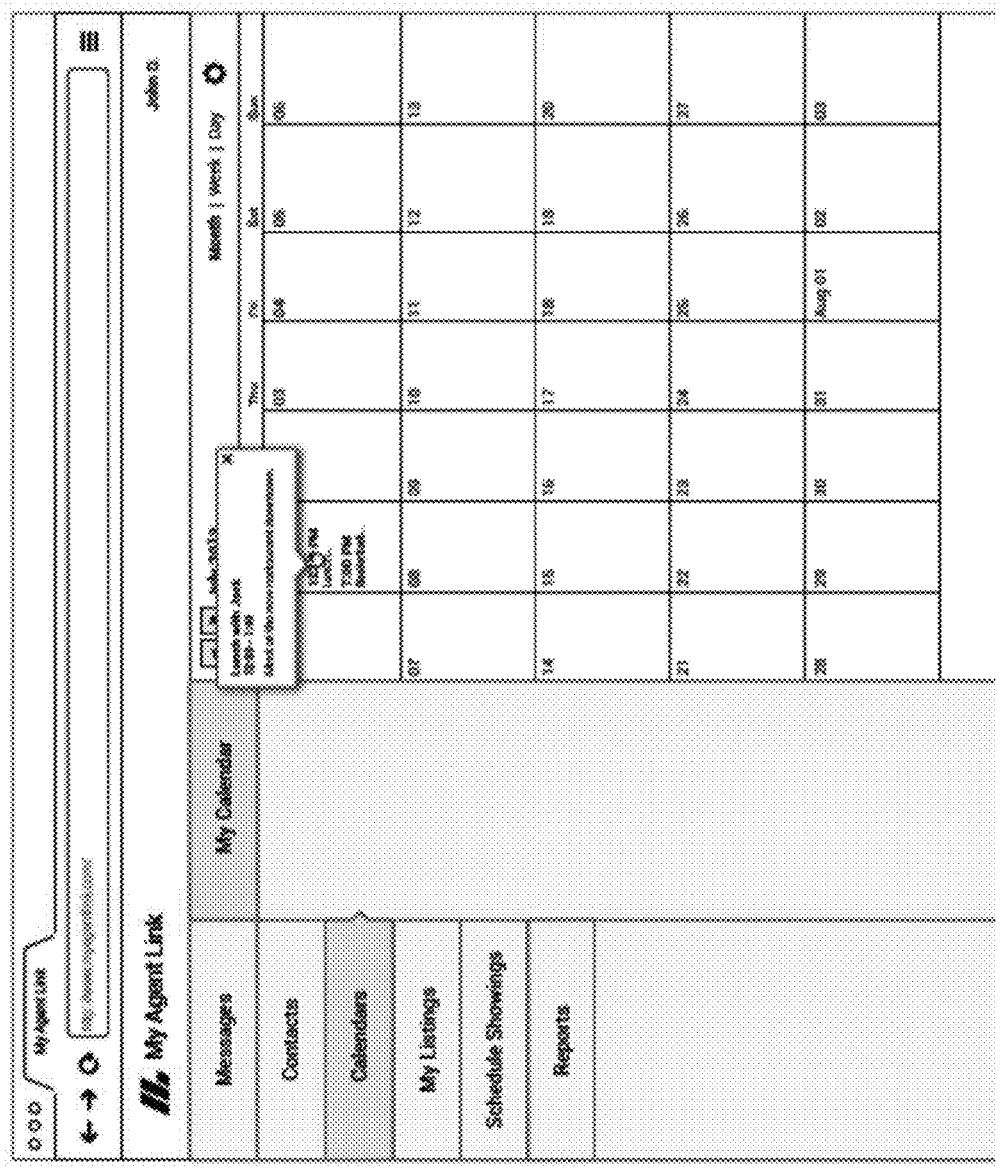
Figure 9:
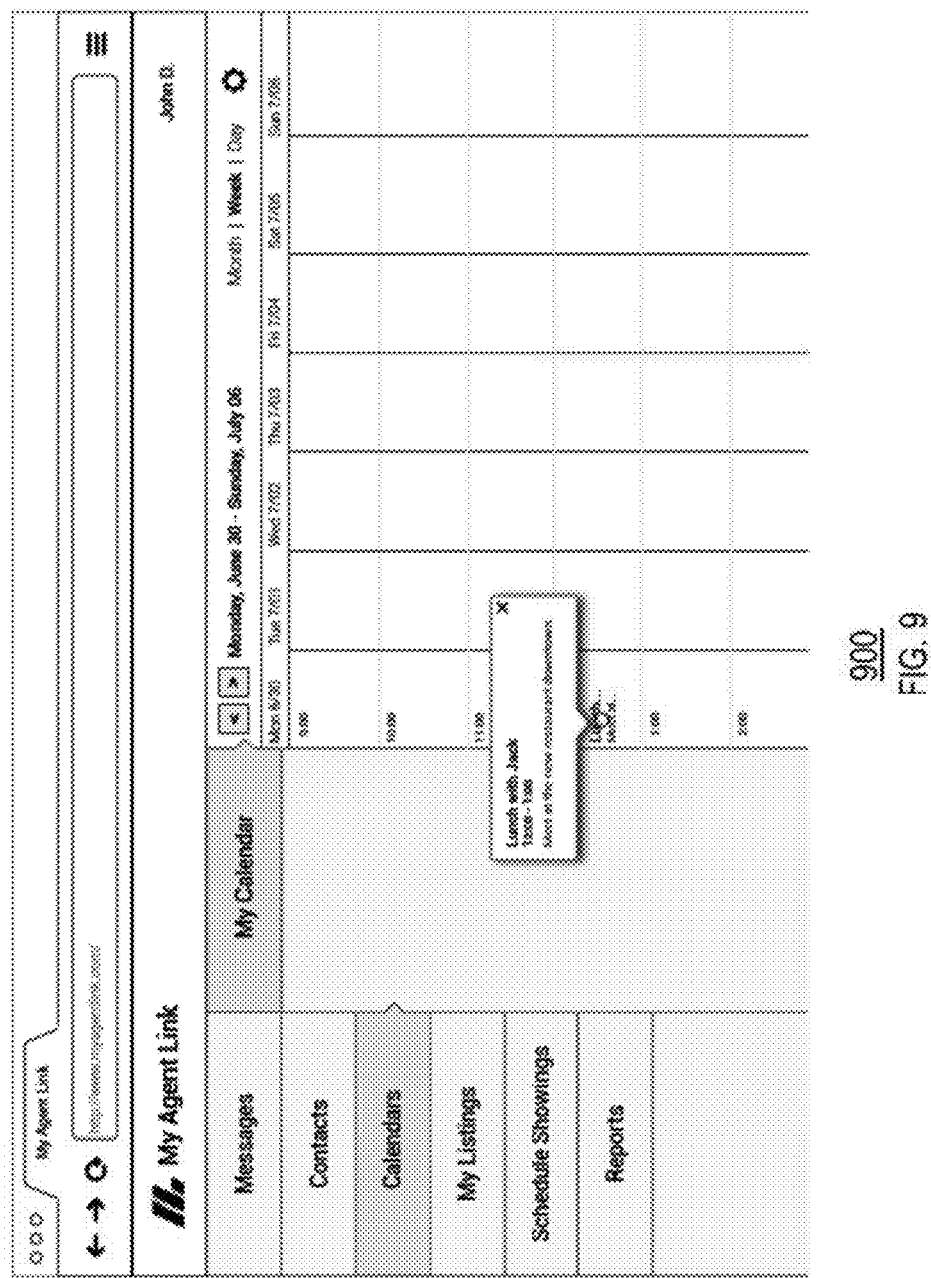
Figure 10:
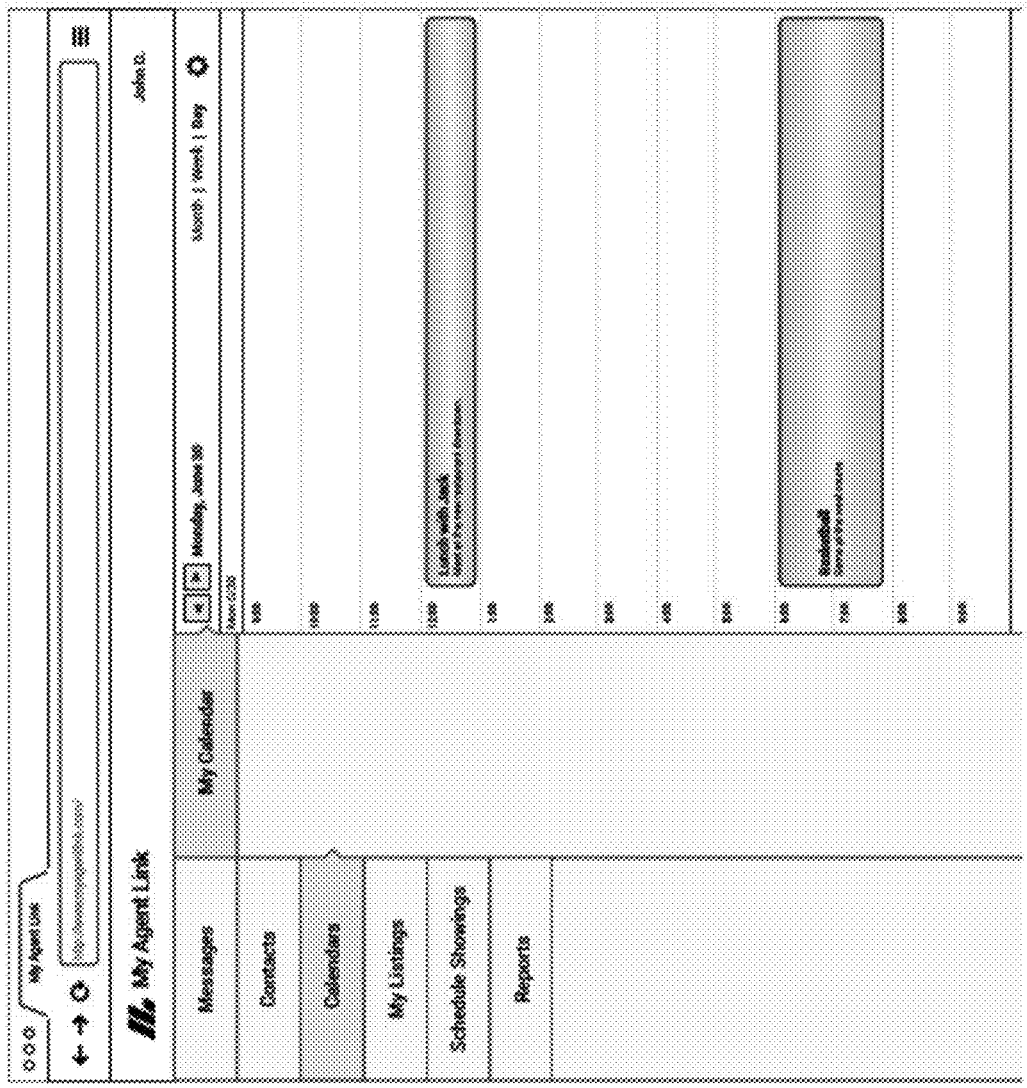
Figure 11:
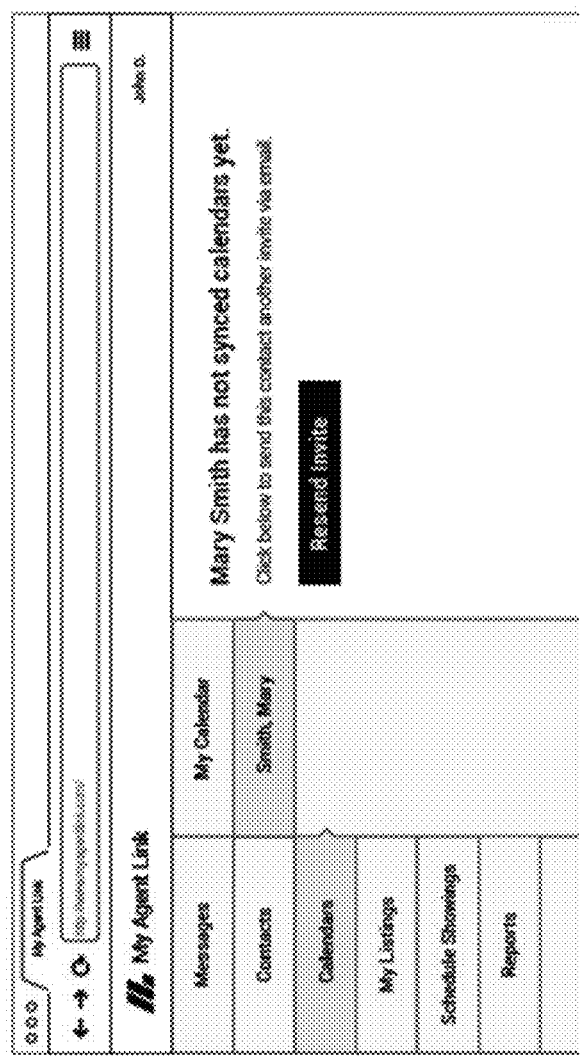
Figure 12:
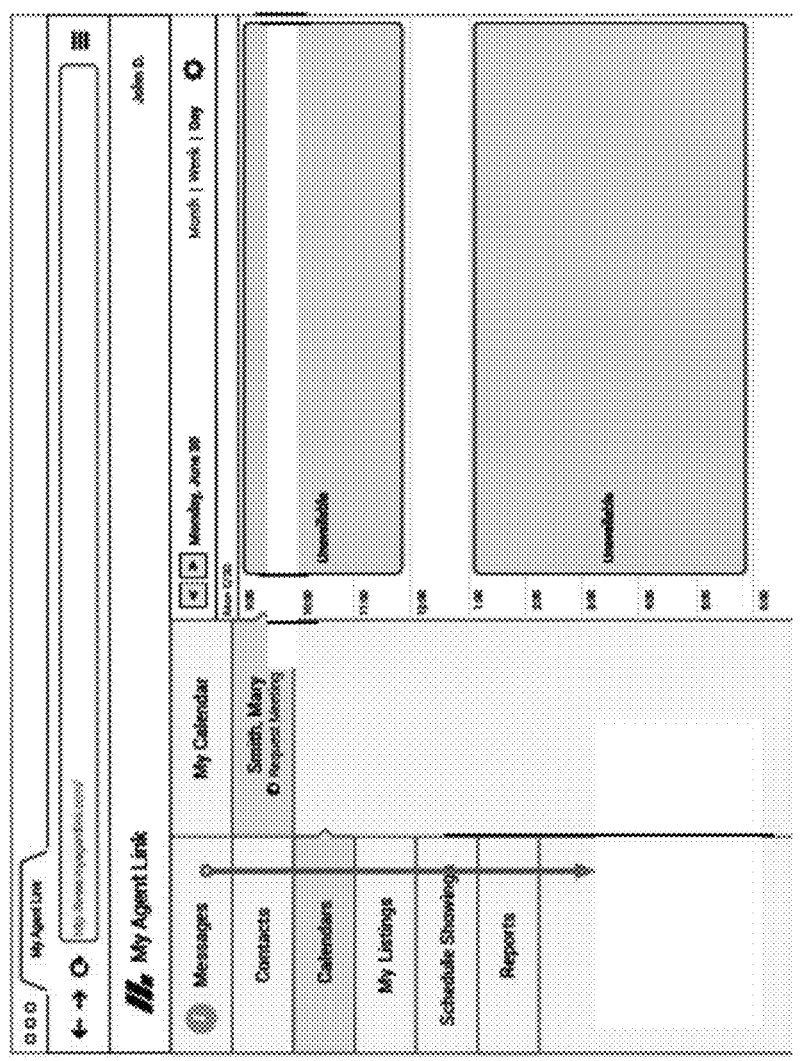
Figure 13:
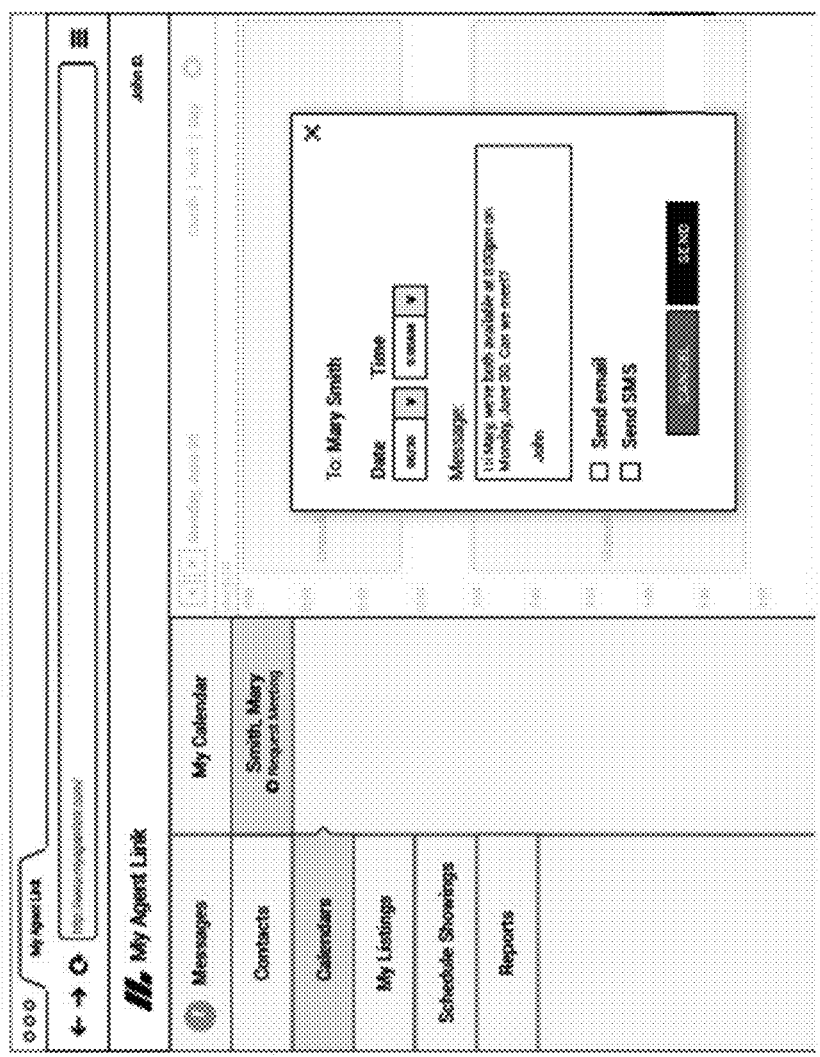
Figure 14:
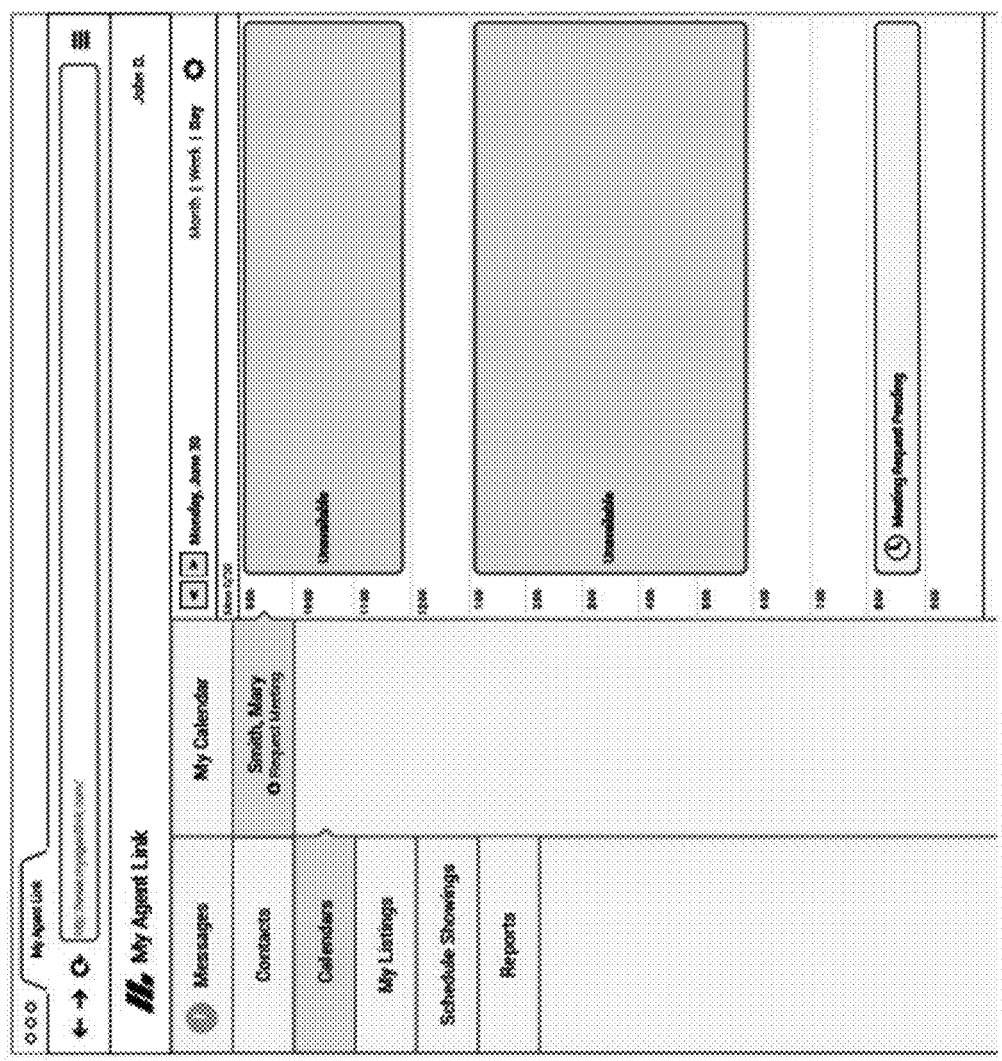
Figure 16:
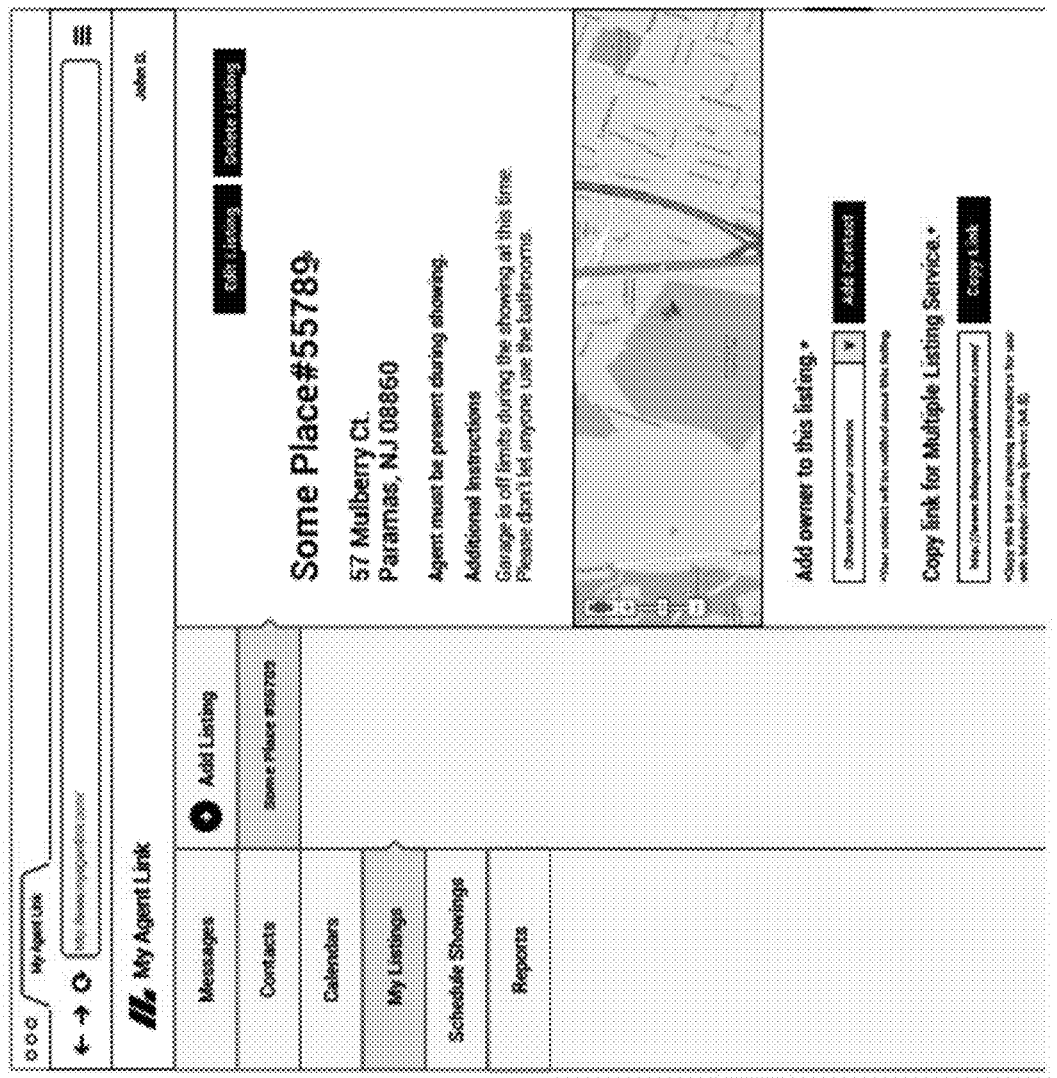
Figure 17:
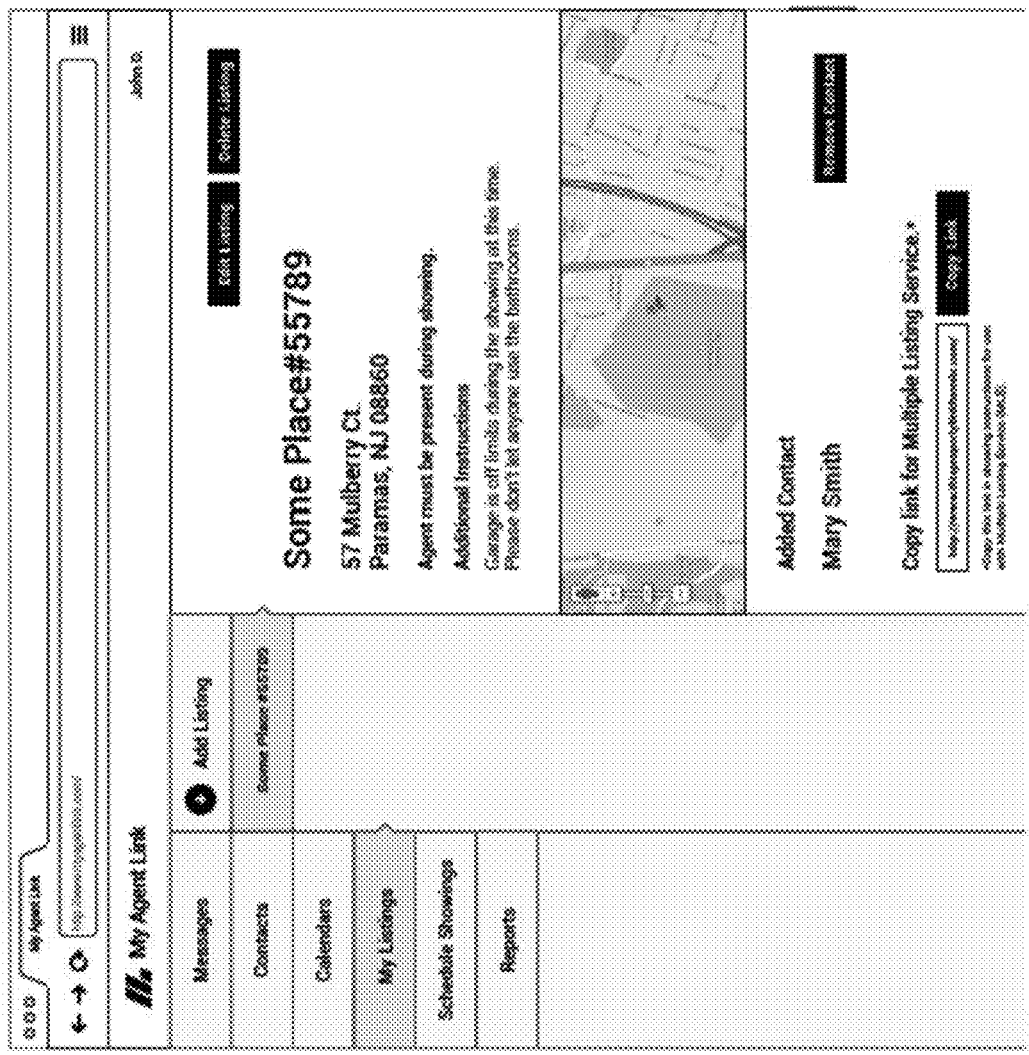

After a BACE (e.g., a buyer's agent (e.g., showing agent)) may sign up and log on to the SSP at step 302 of process 200 (e.g., using a BACE client subsystem 90*c*), the BACE may go to a contacts tab to invite and add one or more of its buyer clients ("BCEs") at step 304, which may enable the BACE to gain access to communicate with each BCE client (e.g., via the SSP) at step 306 and/or to view the client information through the SSP at step 308 (e.g., at one or more of screens 400-600 of FIGS. 4-6, which may be exemplary contact screens once an agent or other professional adds a client/contact to its profile, where the contact may be added via an electronic invite in some embodiments). The BACE may sync its personal calendar and/or manage its meetings or appointments directly via the SSP at step 310 (e.g., at one or more of screens 700-1000 of FIGS. 7-10). The BACE may additionally or alternatively leverage a preferences functionality of the SSP for any suitable purpose at step 320, such as to set up priority of days for showings, to set up earliest and latest available times for showings, potential location based GPS preferences, and/or the like for that BACE client entity generally and/or for that client entity with respect to one or more listings or types of listings (e.g., at screen 1900 of FIG.

19), where a BACE may have a first preference for a first type of listing and a second preference for a second type of listing (e.g., a client entity may define a preference of Fridays over Saturdays for appointments for real estate listings worth more than $1,000,000.00 and a preference of Saturdays over Fridays for appointments for real estate listings worth less than $1,000,000.00). Once a BCE (e.g., client) of the BACE signs up for the SSP (e.g., based on an invitation from the buyer's agent or on its own accord) at step 402 (e.g., using a BCE client subsystem 90*d*), the BCE may also sync its personal calendar to manage its schedule on the SSP at step 404. The BCE may additionally or alternatively also leverage a preferences functionality of the SSP for any suitable purpose at step 406, such as to set up priority of days for showings, and to set up earliest and latest available times for showings, potential location based GPS preferences, and/or the like for that BCE client entity generally and/or for that client entity with respect to one or more listings or types of listings (e.g., at screen 1900 of FIG. 19), where a BCE may have a first preference for a first type of listing and a second preference for a second type of listing (e.g., a client entity may define a preference of Fridays over Saturdays for appointments for real estate listings worth more than $1,000,000.00 and a preference of Saturdays over Fridays for appointments for real estate listings worth less than $1,000,000.00) (e.g., similar to step 320 by the BACE). After the BCE may set up its calendar and may grant permission to a BACE to access that BCE's calendar using the SSP, the BACE may be able to associate with this BCE contact (e.g., via the SSP) to view the BCE's availability under the BCE contact's calendar at step 312 (e.g., at one or more of screens 1100-1400 of FIGS. 11-14, which may show how the SSP may provide a calendar once a client has synced its calendar with an agent's calendar). Knowing the client's availability, the BACE may then be able schedule an appointment or meeting at step 314 with a BCE client, where the client can quickly confirm (e.g., via email or text or otherwise (e.g., via the SSP)) at step 408. The client can also message or otherwise communicate with the agent directly via the SSP with any comments or questions at step 410. Therefore, one or more or all of steps 302, 304, 306, 308, 310, 312, 314, and 320 by a BACE may be similar to one or more or all of respective steps 102, 104, 106, 108, 112, 114, 116, and 122 by an SACE, and/or one or more or all of steps 402, 404, 406, 408, and 410 by a BCE may be similar to one or more or all of respective steps 202, 204, 206, 208, and 210 by an SCE.

Figure 18:
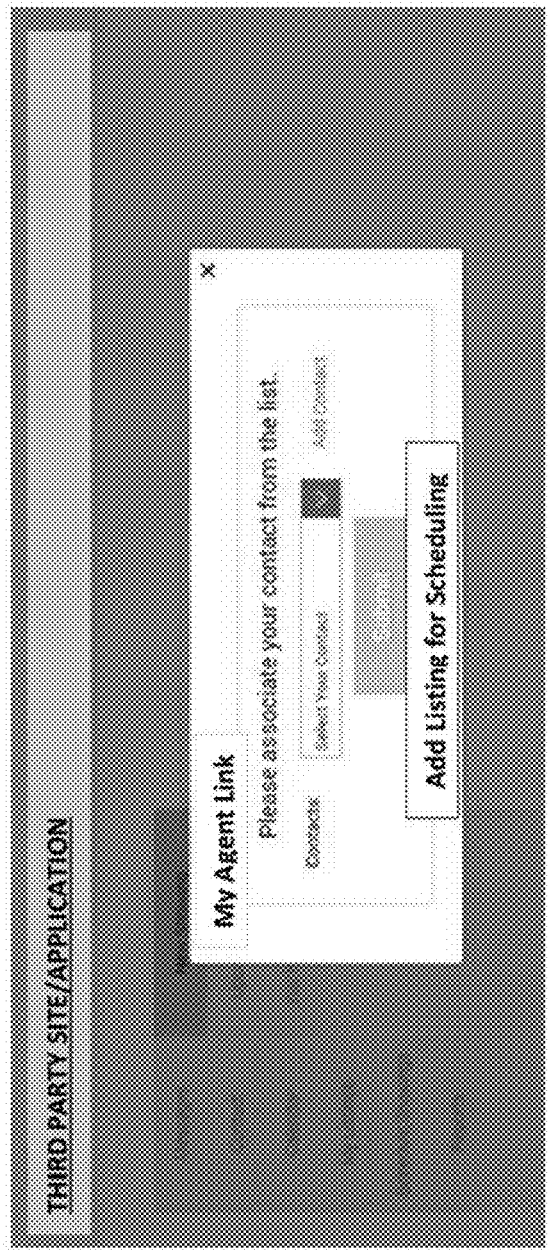

The BACE may select an object (e.g., click on the link from a third party site) that may have been posted from the SCE or the SACE (e.g., as described above with respect to screens 1500-1700 of FIGS. 15-17 and step 120) to be directed to the SSP, where the BACE may sign in and select the BCE to whom the BACE wants to show the specific listing at step 316 (e.g., at screen 1800 of FIG. 18, which may illustrate how, in response to a BACE clicking on a link (e.g., provided on a third party site or app) that may be initially set up by an SACE listing agent at step 120 for the listing(s) that the SACE wants to make appointments, the SSP may enable the BACE to sign on and to select the BCE contact that the BACE may want to show the property to and/or may enable the BACE to add the listing for scheduling (e.g., add the listing to the list of listings for a particular scheduling request (e.g., the list of screen 2000 of FIG. 20))). The BACE can repeat the process by clicking on the different third party links to add multiple listings to schedule consecutive appointments at one time (e.g., at one or more of screens 2000-2300 of FIGS. 20-23, which may illustrate the BACE selecting each of the one or more properties that the BACE wants to make appointments for by clicking on the third party link that was set up by the SACE (e.g., listing agent) or SCE for each respective property, such that, once they are selected and added to the BACE's profile of the SSP and the schedule showing button is clicked, the SSP may be operative to give available time slots to the BACE for showing confirmation). Alternatively, or additionally, the SSP may provide the BACE with the option to manually add the address and listing information of a property at step 318 (e.g., at screen 2000 of FIG. 20) to schedule an appointment for a non-linked property of the SSP with the other linked listings of the SSP at that time. Screen 2000 may be an "add date to showing" screen, screen 2100 may be a "processing showing" screen, and/or screen 2200 and/or 2300 may be a "showing times" screen for a BACE or for a BCE itself.

Figure 20:
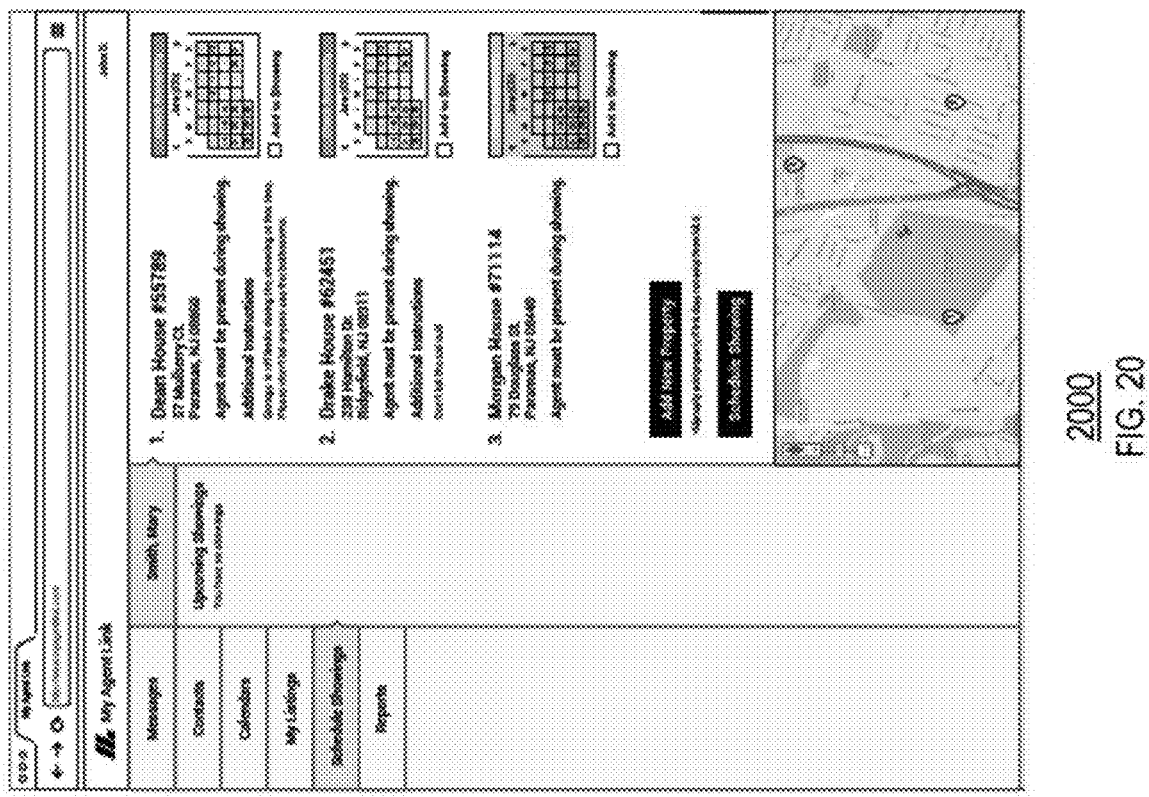
Figure 21:
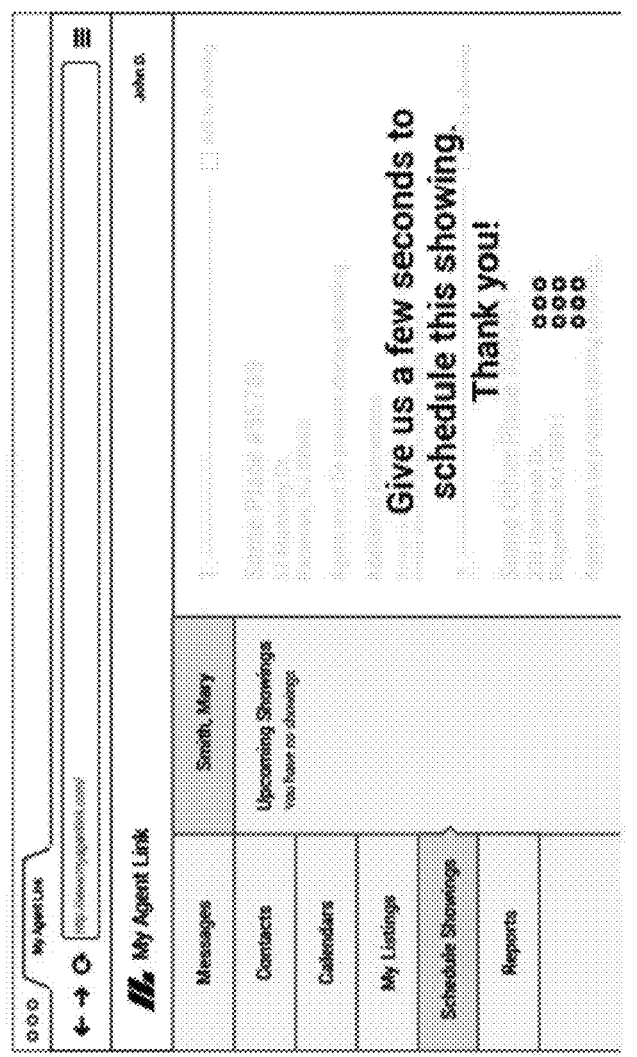
Figure 22:
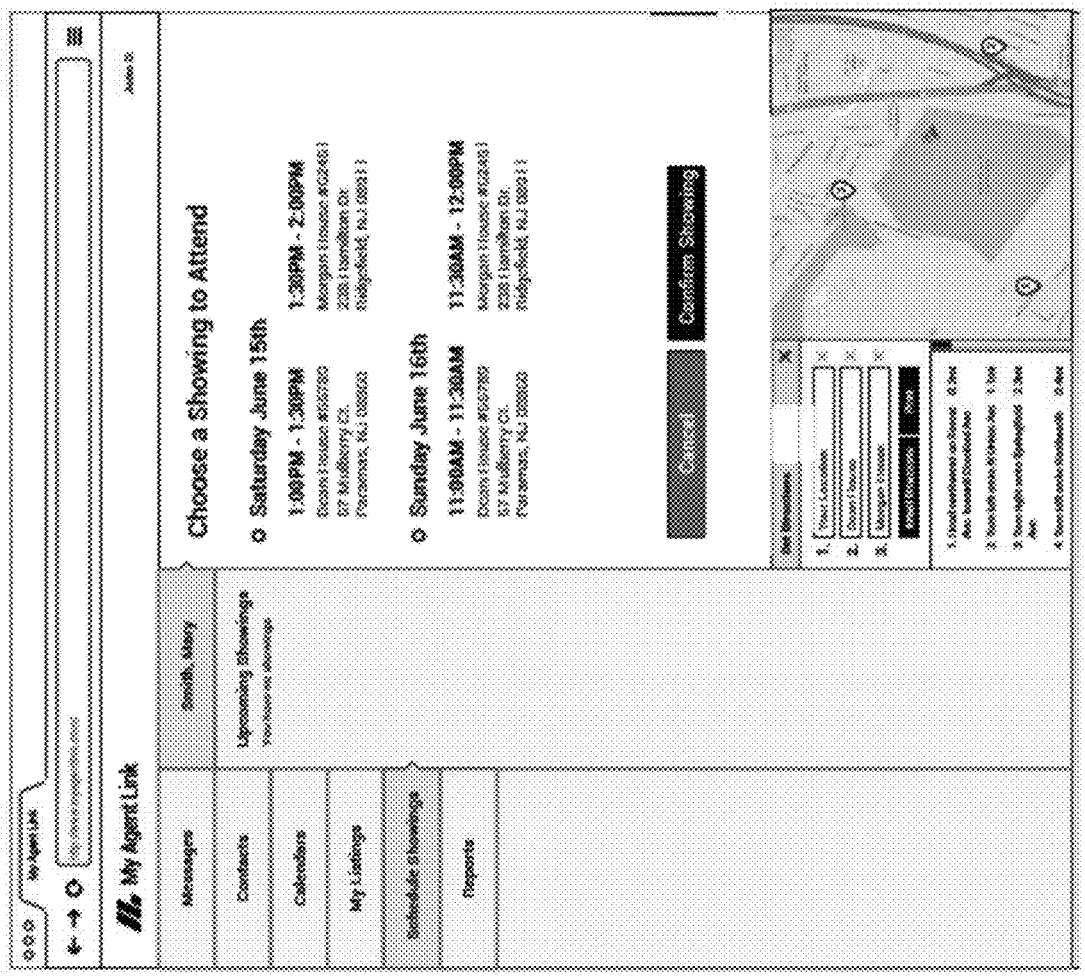
Figure 24:
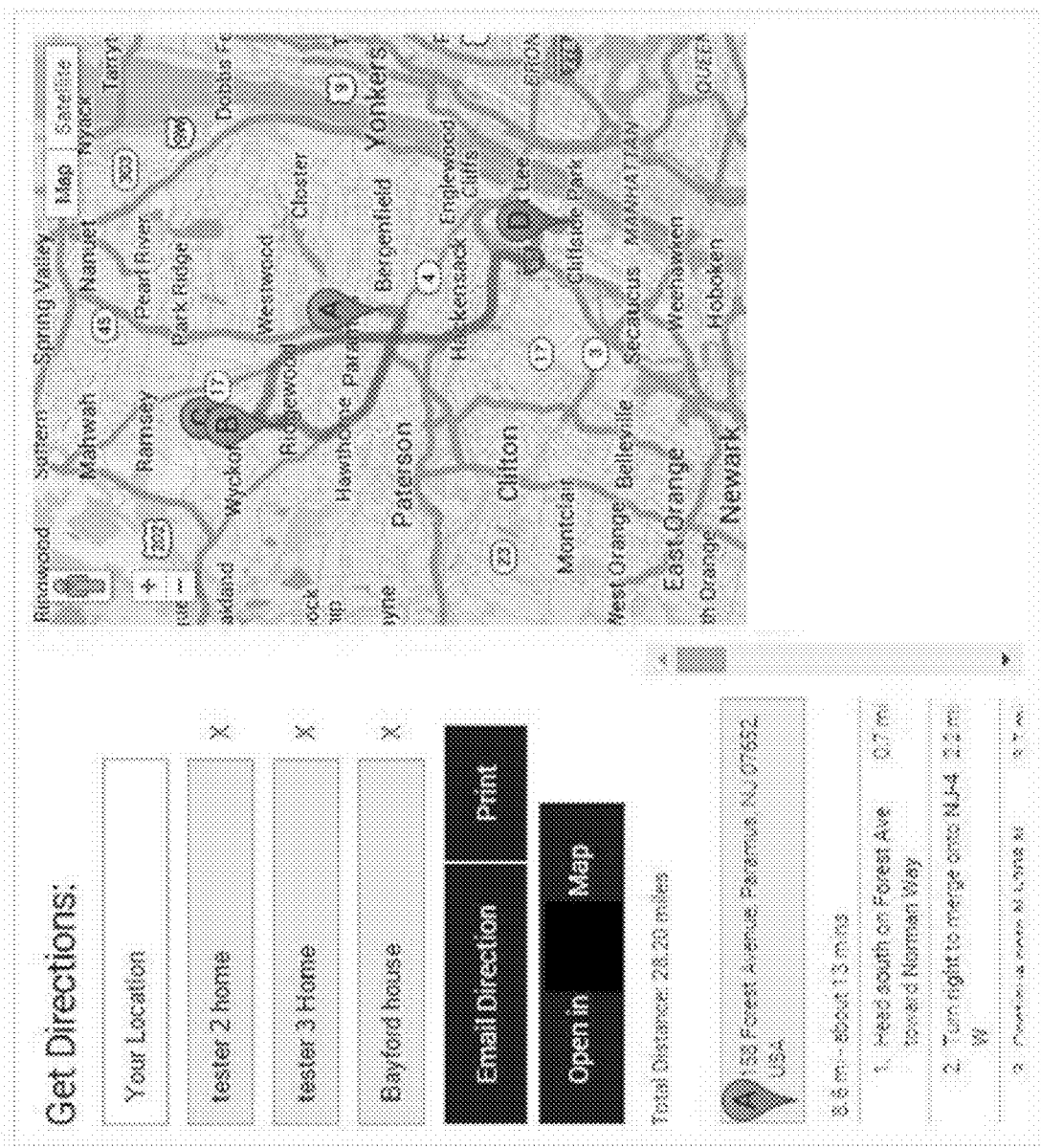
Figure 27:
Figure 28:
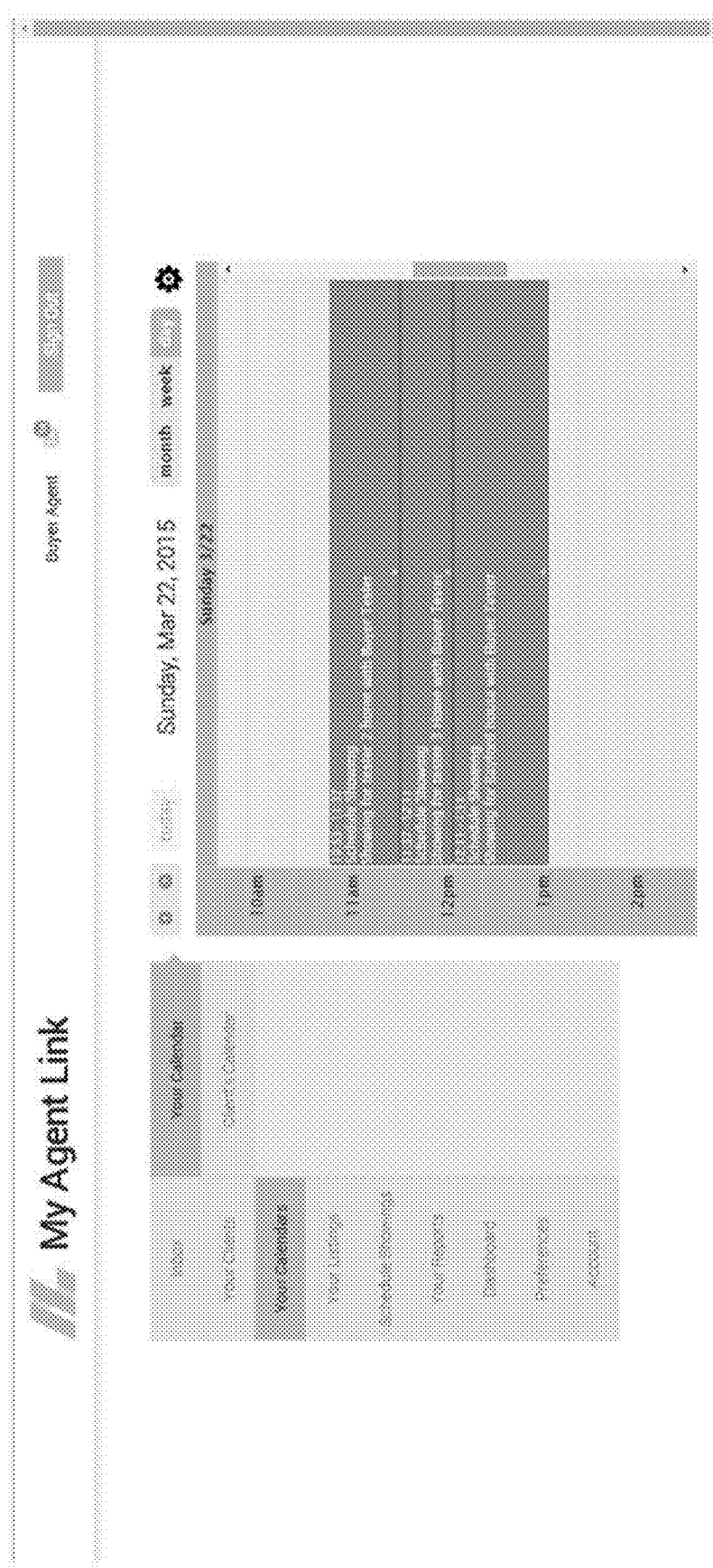
Figure 29:
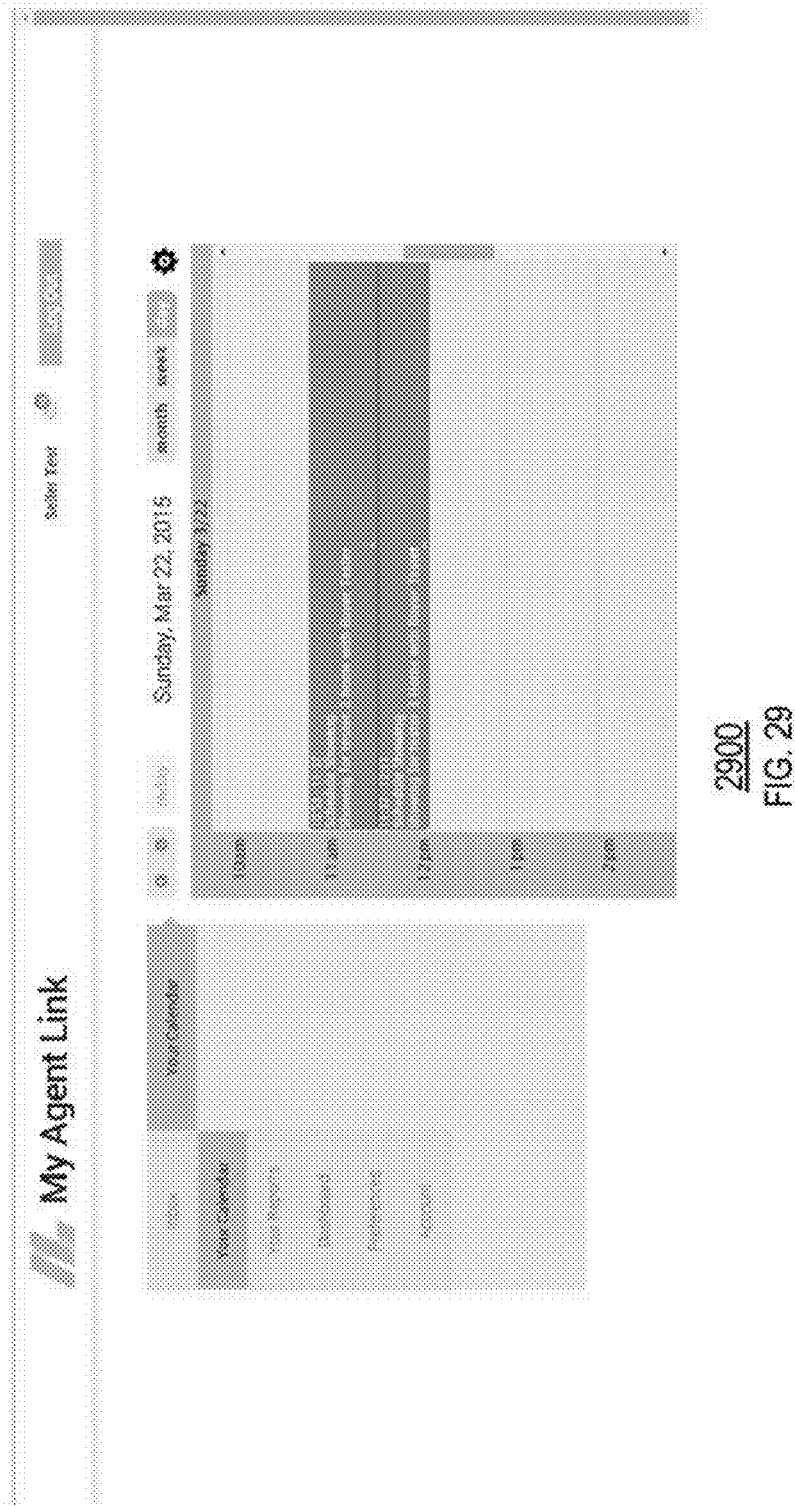
Figure 30:
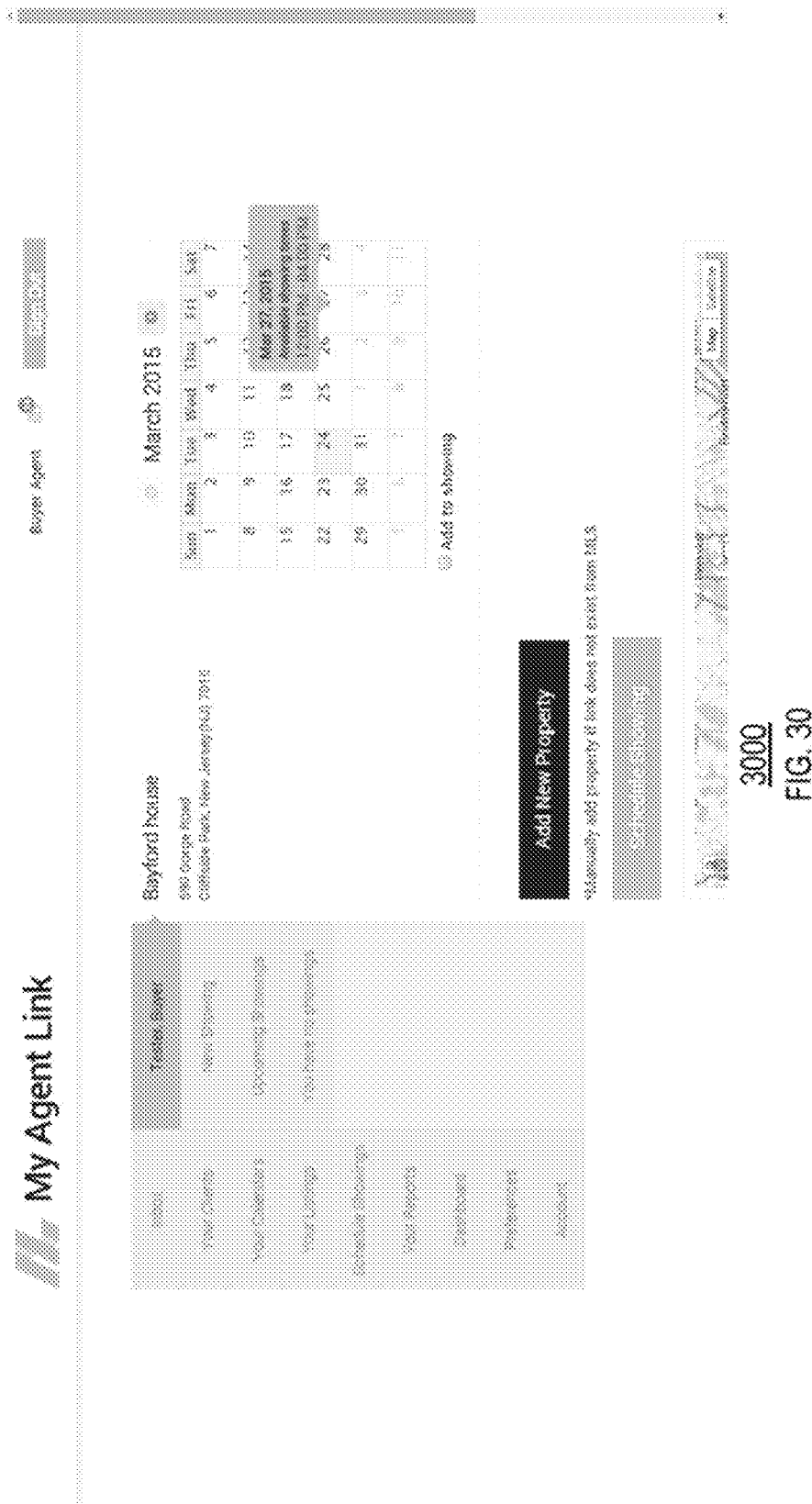

The BACE can select a specific day with respect to a particular property and the SSP may provide the BACE with the available times for all the parties involved to schedule a showing for that specific listing (e.g., at one or more of screens 3000 and 3100 of FIGS. 30 and 31, which may be provided as more detail in response to selection of a calendar of a listing of screen 2000 of FIG. 20). This may be performed by an algorithm running at the time the screen is loaded. Alternatively, or additionally, once the BACE has added the number of listings the BACE would like to view at one time (e.g., in a single session that may be a single day, a duration of a particular amount of hours, etc.), the BACE may click a schedule showings button at step 320 (e.g., at screen 2000 of FIG. 20) and the SSP may run one or more suitable algorithms and/or processes at step 502. A duration of a single session for the appointments to be scheduled for a particular showing session may be defined by any suitable client entity (e.g., in the preferences of a BACE or at a session duration selection option (e.g., with an option of screen 2000 of FIG. 20 (not shown))) or may be defined to be as short as possible based on the other constraints of the scheduling algorithm(s), but may be prevented from being longer than any suitable maximum session amount, such as 6 hours or otherwise, which may be defined by any suitable client entity or by the SSP itself. Based on any suitable variables, such as the scheduling preferences, which may be set by one or more of the two or more applicable users (e.g., by the seller SCE at step 206, by the listing agent or seller's agent SACE at step 122, by the buyer BCE at step 406, and/or by the showing agent or buyer's agent BACE at step 320, such as at screen 1900 of FIG. 19), the calendar availabilities of each party (e.g., which may be set by the seller SCE at step 204, by the listing agent or seller's agent SACE at step 112, by the buyer BCE at step 404, and/or by the showing agent or buyer's agent BACE at step 310, such as at one or more of screens 700-1000 of FIGS. 7-10), the distance between the physical locations of the different listings for which appointments are to be scheduled (e.g., as listed at screen 2000) that may be selected at one or more iterations of step 316 (e.g., by selecting a link to a defined listing or otherwise identifying a defined listing of the SSP) and/or one or more iterations of step 318 (e.g., by providing any suitable information about a listing not yet defined by the SSP) by any suitable client entity (e.g., a BACE and/or BCE), and/or any other suitable data associated with the account of one or more of the applicable client entities, a constraint based algorithm or any other suitable algorithm or set of algorithms or processes of the SSP may be operative to run using various weightings or combinations of these different variables, and at least one schedule output for one property at a particular time or for two or more properties in sequential time order that may be optimized for the order of showings or appointments may be generated by the SSP and presented in any suitable manner to one or more client devices by the SSP (e.g., at one or more of screens 2200 and/or 2300 of FIGS. 22 and 23). Once a user of the client device (e.g., the showing agent BACE or a buyer BCE) selects a particular schedule output of the one or more outputs (e.g., one or more proposed schedules) that may be generated and presented by the SSP for a particular session (e.g., day, afternoon, weekend, etc., as may be preferred by that user) at step 322, that user may click or otherwise select a confirm showings of the SSP (e.g., at screen 2200 of FIG. 22) and any suitable communication (e.g., email and/or other push notifications, etc.) may be sent (e.g., automatically by the SSP) to one, some, or all parties involved with the selected output schedule at step 504 (e.g., at one or more of screens 2500-2700 of FIGS. 25-27) (e.g., to each one of the SACEs associated with each property of the showings, each one of the SCEs associated with each property, the BACE, and/or the BCE) and/or any suitable communication may be facilitated by the SSP between any two or more of the parties involved (e.g., via any suitable communication protocol that may be supported or otherwise made possible by the SSP (e.g., through making contact information available to each party and/or by enabling direct communication between the parties through the SSP)). An event associated with the selected showing output schedule may then be added to one, some, or all parties' calendars of or via the SSP for reference (e.g., at screen 2800 of FIG. 28 for a BACE, and/or at screen 2900 of FIG. 29 for an SCE). The referenced event times may then be used as a constraint for the specified times as not available for other event scheduling that may be attempted for and/or around those times in the future. Even for the BACE added listings from step 318, any suitable communication may be sent to a third party SACE that may not be in the system to confirm the event time. If there is a change or cancellation in schedule from any party associated with an original event, the SSP may reprioritize the algorithm output. Any suitable variables and associated weightings may be leveraged by the algorithm including, but not limited to, the following possible variables and potential associated weightings (in brackets), although it is to be understood that any suitable set of variables with any suitable weightings may be used:

BCE's location prior to event [5%]
BCE's day preferences [5%]
BCE's time preferences [5%]
BCE's calendar availability [15%]
BACE's location prior to event [20%]
BACE's day preferences [1%]
BACE's time preferences [1%]
BACE's calendar availability [5%]
SCE's location prior to event [20%]
SCE's day preferences [1%]
SCE's time preferences [1%]
SCE's calendar availability [5%]
SACE's location prior to event [1%]
SACE's day preferences [1%]
SACE's time preferences [1%]
SACE's calendar availability [1%]
Set-Up/Travel time (e.g., distance & traffic) between event location and party's location prior to event for each party [8%]
Duration for event (e.g., based on size of property to be shown) [4%]

The algorithm output may consider the duration of an event to be scheduled (e.g., the amount of time that each applicable party may need to be available at the same time to make the event worthwhile). For example, for a real-estate showing of a house, the size of the house (e.g., square footage, # of bedrooms, etc.) may be at least one factor to be considered when determining the duration for the event. The duration of the event may be determined automatically by the SSP or may be provided as a defined input by an applicable party (e.g., by the SACE (e.g., as data defining a listing (e.g., at step 118))). Each applicable party's availability may be based on times that they are free to participate in a not yet scheduled event, but a portion of that availability may need to be utilized for enabling the party to participate in such an event, such as for physically traveling from a first location to the location of the event or for ensuring a robotic agent of the party (e.g., a drone) is able to arrive at the location of the event, or for setting up a remote virtual connection (e.g., a video conference) for enabling the party to conduct its required business during the event. Once a location of an event is known, an applicable party's location may be determined (e.g., a location generally associated with the party (e.g., location identified in a user profile of the SSP, such as an office or home address of the party) or a specific location of the party associated with a particular time just prior to a time that may be used for a to be scheduled event (e.g., based on data associated with other events in a party's calendar or data otherwise accessible to the SSP)), such that a party's location prior to a potential time frame for a to be scheduled event may be taken into account with respect to the location of such an event in order to determine a set-up/travel time for that party with respect to preparing for such an event. For example, traffic and/or distance between party location and event location may be one or more variables that may be used for taking into account set-up/travel time for a party to an event such that such time may be added to or otherwise accounted for in addition to event duration to determine whether a party's availability may work for a particular window of time for a to be scheduled event. For example, driving, mass transit, and/or walking time between locations may be determined and processed when calculating appointment times for one or more showings in an event (e.g., at screen 2300 of FIG. 23, which may show more details than similar screen 2200 of FIG. 22, such as the travel time of the viewing user from a location prior to a first event to the location of the first event and the travel time between the first event and a second event, etc.), such that a user may choose one of multiple suggested showing schedules. In addition, the traffic time (e.g., for driving) may be considered. Each party's GPS location may be considered when the algorithm runs and calculates the optimal route and time constraints for each party to attend the scheduled showings (e.g., at screen 2400 of FIG. 24), where such data may be utilized by SS subsystem 10 alone or in combination with processing capabilities of and/or auxiliary data from one or more TPE subsystems 90*e* (e.g., Google Maps or Waze Traffic) or from SS subsystem 10 itself to estimate travel time for a potential future trip by a party from a first location to a second location at a particular future time (e.g., based on any suitable travel data that may be used to make such an estimation (e.g., traffic analytics, weather data, mass transit delays or route cancellations, and/or any other suitable auxiliary data that may affect the length of time and/or manner in which a client entity or representative or agent or other proxy (e.g., drone) may travel to or between appointments). As shown in FIG. 2, process 200 may include any suitable auxiliary data being imported, determined, or otherwise obtained at step 501 (e.g., by SS subsystem 10 (e.g., independently or at least partially from one or more TPE subsystems 90*e*)). Also, if a party has a prior meeting before the scheduled showing, the SSP may use that location information to calculate the driving time and optimal route for the showing event. Therefore, the algorithm may not only take into account the windows of availability for each party but also the location of each party at the start of each window to factor the ability of each party to arrive at a particular event location based on travel time, traffic, and the like, where all information may be leveraged to find an appropriate time that works for all parties and an appropriate order if two or more locations are to have events scheduled within a particular time frame. The algorithm may take into consideration levels of availability of different parties, with low, medium, or high preferences or otherwise. Based on how optimized the output of the algorithm is, the BACE or other suitable user may have the option to manually override the algorithm to communicate with a specific party to request an exception and schedule a time in a time slot that may currently be identified by the SSP as unavailable (e.g., on the calendar). Depending on if the scheduled showing is conducted virtually by one or more parties (e.g., with a drone/robotics or in-person through video conferencing), the algorithm may take into consideration flight time of the drone within the location parameters and to different destinations (e.g., as a portion or all of a travel/set-up time for a party that may leverage a drone at a physical location of an event in that party's stead). Other set-up factors may be taken into account, such as virtual conferencing connection times, and the like, even if there is no physical location for an event but an event is to be merely experienced by one or more parties virtually (e.g., a conference call). Therefore, at least one party may not need to physically attend the event at the same location as other parties (e.g., the party may be a remote attendee via video conferencing with or without use of a drone), such that travel time and/or prior location before event information may not need to be taken into account for such a party when algorithmically scheduling via the SSP. In some embodiments, the SSP can provide a platform for the recording, storage, and/or sharing of video conference of a real time or recorded audio and/or video for a virtual walk through or other event media that may be filmed from the drone/robotics or in-person through video conference for any particular event facilitated by the SSP. One, some, or each one of steps 501, 502, and 504 may be performed at least partially by SP subsystem 10.

It is understood that any portion or all of process 200, the SSP, its one or more algorithms, and the like may be utilized for any suitable scheduling of one or more events for two or more parties at one or more locations, and the above is not limited to the realm of scheduling real estate property showings. For example, the above may be utilized by a group of people who may be trying to schedule an event or trip that may require availability of one or more parties with multiple destinations.

It is understood that the steps shown in process 200 of FIG. 2 are merely illustrative and that existing steps may be modified or omitted, additional steps may be added, and the order of certain steps may be altered. While each step of process 200 beginning with a "1" may be described with respect to an action that may be performed by a seller's agent or SACE with respect to the SSP, while each step of process 200 beginning with a "2" may be described with respect to an action that may be performed by a seller or SCE with respect to the SSP, while each step of process 200 beginning with a "3" may be described with respect to an action that may be performed by a buyer's agent or BACE with respect to the SSP, while each step of process 200 beginning with a "4" may be described with respect to an action that may be performed by a buyer or BCE with respect to the SSP, and while each step of process 200 beginning with a "5" may be described with respect to an action that may be performed by the scheduling service or SSP of subsystem 10, it is to be understood that any step may be performed by any suitable entity with respect to the functionality of the SSP and process 200.

FIG. 32 is a flowchart of an illustrative process 3200. At step 3202, process 3200 may create, with an online scheduling service subsystem, a first client account that includes first client account data associated with a first client entity. For example, SS subsystem 10 may be operative to create a first client account of the SSP that may include first client account data associated with any suitable first client entity, such as a first SCE (e.g., with calendar data and/or preference data of a seller client entity at an iteration of step 204 and/or at an iteration of step 206 of process 200) or a first SACE (e.g., with calendar data and/or preference data of a seller's agent client entity of step 112 and/or step 122 of process 200). At step 3204, process 3200 may create, with the online scheduling service subsystem, a first listing that includes first listing data associated with a first construct. For example, SS subsystem 10 may be operative to create a first listing of the SSP that may include first listing data associated with any suitable first construct, such as a first real estate property (e.g., with listing data of a property to be shown at an iteration of step 118 of process 200). At step 3206, process 3200 may create, with the online scheduling service subsystem, a second client account that includes second client account data associated with a second client entity. For example, SS subsystem 10 may be operative to create a second client account of the SSP that may include second client account data associated with any suitable second client entity, such as a second SCE (e.g., with calendar data and/or preference data of another seller client entity at another iteration of step 204 and/or at another iteration of step 206 of process 200, respectively) or a second SACE (e.g., with calendar data and/or preference data of another seller's agent client entity at another iteration of step 112 and/or at another iteration of step 122 of process 200, respectively). At step 3208, process 3200 may create, with the online scheduling service subsystem, a second listing that includes second listing data associated with a second construct. For example, SS subsystem 10 may be operative to create a second listing of the SSP that may include second listing data associated with any suitable second construct, such as a second real estate property (e.g., with listing data of a property to be shown at another iteration of step 118 of process 200). At step 3210, process 3200 may create, with the online scheduling service subsystem, a third client account that includes third client account data associated with a third client entity. For example, SS subsystem 10 may be operative to create a third client account of the SSP that may include third client account data associated with any suitable third client entity, such as a BCE (e.g., with calendar data and/or preference data of a buyer client entity at an iteration of step 404 and/or at an iteration of step 406 of process 200, respectively) or a BACE (e.g., with calendar data and/or preference data of a buyer's agent client entity at an iteration of step 310 and/or at an iteration of step 320 of process 200, respectively). At step 3212, process 3200 may receive, with the online scheduling service subsystem, a request from the third client account to schedule a showing within a particular time frame, wherein the showing includes a first appointment for the third client entity and the first client entity at the first construct and a second appointment for the third client entity and the second client entity at the second construct. For example, SS subsystem 10 may be operative to receive a request (e.g., at one or more of steps 316, 318, and/or 320 of process 200) from a third client account at the SSP to schedule a showing within a particular time frame, where the showing may include a first appointment for a third client entity (e.g., a BCE and/or a BACE) and a first client entity (e.g., a first SCE and/or a first SACE) at a first construct (e.g., a first real estate property) and a second appointment for the third client entity (e.g., a BCE and/or a BACE) and a second client entity (e.g., a second SCE and/or a second SACE) at a second construct (e.g., a second real estate property). At step 3214, in response to receiving the request, process 3200 may generate, with the online scheduling service subsystem, at least one proposed schedule for the showing within the particular time frame based on the first client account data, the second client account data, the third client account data, the first listing data, and the second listing data. For example, in response to receiving a request to schedule such a showing, SS subsystem 10 may be operative to generate (e.g., at step 502 of process 200, automatically and/or through any suitable algorithmic processing of data) at least one proposed schedule for the showing based on first listing data (e.g., listing data of a first property construct to be shown), second listing data (e.g., listing data of a second property construct to be shown), first client account data (e.g., calendar data and/or preference data) of a first client entity (e.g., a first SCE or first SACE of the first property construct), second client account data (e.g., calendar data and/or preference data) of a second client entity (e.g., a second SCE or second SACE of the second property construct), third client account data (e.g., calendar data and/or preference data) of a third client entity (e.g., a BCE or BACE with interest in one or both of the first and second property constructs). In some embodiments, for example, the first client account data may include information indicative of a planned location of the first client entity within the particular time frame (e.g., data from a calendar of the first client entity may be used by the SSP to determine a probable or even planned or confirmed location of the first client entity at any particular time) and/or the second client account data may include information indicative of a planned location of the second client entity within the particular time frame (e.g., data from a calendar of the second client entity may be used by the SSP to determine a probable or even planned or confirmed location of the second client entity at any particular time) and/or the third client account data may include information indicative of a planned location of the third client entity within the particular time frame (e.g., data from a calendar of the third client entity may be used by the SSP to determine a probable or even planned or confirmed location of the third client entity at any particular time) and/or the first listing data may include information indicative of a location of the first construct within the particular time frame (e.g., first listing data may be indicative of a fixed location of a first real estate property construct) and/or the second listing data may include information indicative of a location of the second construct within the particular time frame (e.g., second listing data may be indicative of a fixed location of a second real estate property construct). In such embodiments, the at least one proposed schedule may also be generated based on auxiliary data that may include information indicative of an estimate of at least one, some, or all of a travel time within the particular time frame between the planned location of the first client entity and the location of the first construct, a travel time within the particular time frame between the planned location of the second client entity and the location of the second construct, a travel time within the particular time frame between the planned location of the third client entity and the location of the first construct, a travel time within the particular time frame between the planned location of the third client entity and the location of the second construct, and a travel time within the particular time frame between the location of the first construct and the location of the second construct, where such auxiliary data may be accessed from any suitable source, such as a third party enabler subsystem (e.g., a traffic analytic data source, a mapping data source, and/or the like).

It is understood that the steps shown in process 3200 of FIG. 32 are merely illustrative and that existing steps may be modified or omitted, additional steps may be added, and the order of certain steps may be altered.

FIG. 33 is a flowchart of an illustrative process 3300 for generating, with the online scheduling service subsystem (e.g., as an automated computer-implemented method with at least a computer of SS subsystem 10), at least one proposed schedule for a requested showing of two or more (e.g., three) properties or other suitable listings for two or more (e.g., at least four) client entities, where process 3300 may be carried out by any suitable computer-implemented processing of the SSP (e.g., at SS subsystem 10), such as at step 502 of process 200 and/or at step 3214 of process 3200. At step 3302, process 3300 may include running a while loop statement (e.g., a control flow statement that may allow code to be executed repeatedly based on a given boolean condition, such as a repeating if statement) for each iteration of a particular time frame (e.g., each iteration of day and time slot) with the various applicable availability constraints of the requested showing (e.g., availability of each applicable client entity and/or listing) that may be true. For example, the SSP may run a while loop statement for each iteration of day and time slot for each of the following exemplary (but not required nor exclusive) availability constraints that are true or otherwise available:
  (a) Calendar availability of a BCE (e.g., client entity to attend each of the multiple appointments);
  (b) Calendar availability of a BACE of the BCE (e.g., if applicable);
  (c) Calendar availability of a $1^{st}$ Listing;
  (d) Calendar availability of a $1^{st}$ SCE (e.g., a $1^{st}$ client entity to attend appointment for the $1^{st}$ Listing);
  (e) Calendar availability of a $1^{st}$ SACE (e.g., another $1^{st}$ client entity to attend appointment for the $1^{st}$ Listing (if applicable));
  (f) Calendar availability of a $2^{nd}$ Listing;
  (g) Calendar availability of a $2^{nd}$ SCE (e.g., a $2^{nd}$ client entity to attend appointment for $2^{nd}$ Listing);
  (h) Calendar availability of a $2^{nd}$ SACE (e.g., another $2^{nd}$ client entity to attend appointment for the $2^{nd}$ Listing (if applicable));
  (i) Calendar availability of a $3^{rd}$ Listing;
  (j) Calendar availability of a $3^{rd}$ SCE (e.g., a $3^{rd}$ client entity to attend appointment for the $3^{rd}$ Listing); and
  (k) Calendar availability of a $3^{rd}$ SACE (e.g., another $3^{rd}$ client entity to attend appointment for the $3^{rd}$ Listing (if applicable)).

Next, at step 3304, process 3300 may include parsing the data from step 3302 with one, some, or each of the various applicable preference constraints of the requested showing (e.g., preference of each applicable client entity and/or listing) that may be true or otherwise available with one particular set of weights or multiple times with different sets of weights, while running a loop statement (e.g., of step 3306) for route optimization. For example, at step 3304, the SSP may parse data from step 3302 for each of the following exemplary (but not required nor exclusive) preference constraints that are true or otherwise available (e.g., a single time with a particular set of weights for the constraints or multiple times with multiple different sets of weights for the constraints that may vary in any suitable way):

(l) Preference of $1^{st}$ Characteristic (e.g., Order of Priority Day) of the BCE;
(m) Preference of $2^{nd}$ Characteristic (e.g., Time) of the BCE;
(n) Preference of $1^{st}$ Characteristic (e.g., Order of Priority Day) of the BACE (e.g., if applicable);
(o) Preference of $2^{nd}$ Characteristic (e.g., Time) of the BACE (e.g., if applicable);
(p) Preference of $1^{st}$ Characteristic (e.g., Order of Priority Day) of the $1^{st}$ Listing;
(q) Preference of $2^{nd}$ Characteristic (e.g., Time) of the $1^{st}$ Listing;
(r) Preference of $1^{st}$ Characteristic (e.g., Order of Priority Day) of the $1^{st}$ SCE;
(s) Preference of $2^{nd}$ Characteristic (e.g., Time) of the $1^{st}$ SCE;
(t) Preference of $1^{st}$ Characteristic (e.g., Order of Priority Day) of the SACE (e.g., if applicable);
(u) Preference of $2^{nd}$ Characteristic (e.g., Time) of the $1^{st}$ SACE (e.g., if applicable);
(v) Preference of $1^{st}$ Characteristic (e.g., Order of Priority Day) of the $2^{nd}$ Listing;
(w) Preference of $2^{nd}$ Characteristic (e.g., Time) of the $2^{nd}$ Listing;
(x) Preference of $1^{st}$ Characteristic (e.g., Order of Priority Day) of the $2^{nd}$ SCE;
(y) Preference of $2^{nd}$ Characteristic (e.g., Time) of the $2^{nd}$ SCE;
(z) Preference of $1^{st}$ Characteristic (e.g., Order of Priority Day) of the $2^{nd}$ SACE (e.g., if applicable);
(aa) Preference of $2^{nd}$ Characteristic (e.g., Time) of the $2^{nd}$ SACE (e.g., if applicable);
(bb) Preference of $1^{st}$ Characteristic (e.g., Order of Priority Day) of the $3^{rd}$ Listing;
(cc) Preference of $2^{nd}$ Characteristic (e.g., Time) of the $3^{rd}$ Listing;
(dd) Preference of $1^{st}$ Characteristic (e.g., Order of Priority Day) of the $3^{rd}$ SCE;
(ee) Preference of $2^{nd}$ Characteristic (e.g., Time) of the $3^{rd}$ SCE;
(ff) Preference of $1^{st}$ Characteristic (e.g., Order of Priority Day) of the $3^{rd}$ SACE (e.g., if applicable); and
(gg) Preference of $2^{nd}$ Characteristic (e.g., Time) of the $3^{rd}$ SACE (e.g., if applicable).

For each iteration of step 3304, a loop statement may be run by process 3300 at step 3306 for route optimization for the various applicable travel constraints of the requested showing (e.g., of each applicable client entity and/or listing) to identify optimal route and total required time, such that steps 3302-3306 may together determine an order (e.g., from most to least important) for listing appointments of at least one proposed schedule for the requested showing. For example, at one or some or each iteration of step 3306, the SSP may run a loop statement for each of the following exemplary (but not required nor exclusive) travel constraints that are true or otherwise available:

(hh) Location of the BCE prior to the event (e.g., location at time just prior to or at start of the particular schedule being processed for potential proposition);
(ii) Location of the BACE prior to the event (e.g., if applicable);
(jj) Transportation Method of BCE;
(kk) Transportation Method of BACE (e.g., if applicable);
(ll) Location of the $1^{st}$ Listing;
(mm) Location of the $1^{st}$ SCE prior to the $1^{st}$ event (e.g., location at time just prior to or at start of the appointment for the $1^{st}$ Listing of the particular schedule being processed for potential proposition);
(nn) Location of the $1^{st}$ SACE prior to the $1^{st}$ event (e.g., if applicable);
(oo) Transportation Method of the $1^{st}$ SCE;
(pp) Transportation Method of the $1^{st}$ SACE (e.g., if applicable);
(qq) Duration of Appointment for $1^{st}$ Listing;
(rr) Location of the $2^{nd}$ Listing;
(ss) Location of the $2^{nd}$ SCE prior to the $2^{nd}$ event (e.g., location at time just prior to or at start of the appointment for the $2^{nd}$ Listing of the particular schedule being processed for potential proposition);
(tt) Location of the $2^{nd}$ SACE prior to the $2^{nd}$ event (e.g., if applicable);
(uu) Transportation Method of the $2^{nd}$ SCE;
(vv) Transportation Method of the $2^{nd}$ SACE (e.g., if applicable);
(ww) Duration of Appointment for $2^{nd}$ Listing;
(xx) Location of the $3^{rd}$ Listing;
(yy) Location of the $3^{rd}$ SCE prior to the $3^{rd}$ event (e.g., location at time just prior to or at start of the appointment for the $3^{rd}$ Listing of the particular schedule being processed for potential proposition);
(zz) Location of the $3^{rd}$ SACE prior to the $3^{rd}$ event (e.g., if applicable);
(aaa) Transportation Method of the $3^{rd}$ SCE;
(bbb) Transportation Method of the $3^{rd}$ SACE (e.g., if applicable);
(ccc) Duration of Appointment for $3^{rd}$ Listing;
(ddd) Traveling time of each client entity's required travel;
(eee) Weather and traffic conditions associated with each client entity's required travel; and
(fff) Holiday or special events considerations associated with each client entity's required travel.

The output of step 3306 may not necessarily be in sequential order of listings. Then, at step 3308, process 3300 may include presenting or otherwise providing (e.g., filtering and outputting) at least one (e.g., two or more) proposed (e.g., optimized) schedules for the requested showing of multiple appointments or listings based on steps 3302-3306, where two or more proposed schedules may be ordered for presentation based on earliest $1^{st}$ event of the proposed schedule, where the earliest $1^{st}$ event of the two or more proposed schedules may preferably be within a week of when the showing was requested (e.g., of when the request was received by the SSP).

It is understood that the steps shown in process 3300 of FIG. 33 are merely illustrative and that existing steps may be modified or omitted, additional steps may be added, and the order of certain steps may be altered.

One, some, or all of the processes described above may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium may include but are not limited to a read only memory, a random access memory, a flash memory, a CD ROM, a DVD, a magnetic tape, a removable memory card, and a data storage device (e.g., memory 13 and/or data structure 19 of FIG. 1 and/or memory 93 and/or data structure 99 of FIG. 1A). In other embodiments, the computer-readable medium may be a transitory computer-readable medium. In such embodiments, the transitory computer-readable medium can be distributed over network coupled computer systems so that the computer-readable code is stored and executed in a distributed fashion. For example, such a transitory computer-readable medium may be communicated from an SS subsystem to a client subsystem, from a client subsystem to an SS subsystem, and/or from one client subsystem to another client subsystem using any suitable communications protocol (e.g., the computer-readable medium may be communicated to a subsystem 90 via communications component 14/94 (e.g., as at least a portion of an application 99)). Such a computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of system 1 may be described in the general context of computer executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for a scheduling service, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:
1. A method comprising:
creating, with an online scheduling service subsystem, a first client account that comprises first client account data associated with a first client entity;
creating, with the online scheduling service subsystem, a first listing that comprises first listing data associated with a first construct;
creating, with the online scheduling service subsystem, a second client account that comprises second client account data associated with a second client entity;
creating, with the online scheduling service subsystem, a second listing that comprises second listing data associated with a second construct;
creating, with the online scheduling service subsystem, a third client account that comprises third client account data associated with a third client entity;
after each of the creatings, receiving, with the online scheduling service subsystem, a request from the third client account to schedule a showing within a particular time frame in the future, wherein the showing comprises a first appointment for the third client entity and the first client entity at the first construct and a second appointment for the third client entity and the second client entity at the second construct; and
in response to receiving the request and before the particular time frame in the future, generating, with the online scheduling service subsystem, at least one proposed schedule for the showing within the particular time frame in the future based on:
first information of the first client account data;
second information of the second client account data;
third information of the third client account data;
the first listing data; and
the second listing data, wherein at least one of the following is true:
the first client account data comprises the first information indicative of a planned future location of the first client entity within the particular time frame in the future, wherein the creating the first client account comprises importing the first information with the online scheduling service subsystem from a first calendar of a first subsystem that is remote from the online scheduling service subsystem via a communications network;
the second client account data comprises the second information indicative of a planned future location of the second client entity within the particular time frame in the future, wherein the creating the second client account comprises importing the second information with the online scheduling service subsystem from a second calendar of a second subsystem that is remote from the online scheduling service subsystem via a communications network; and
the third client account data comprises the third information indicative of a planned future location of the third client entity within the particular time frame in the future, wherein the creating the third client account comprises importing the third information with the online scheduling service subsystem from a third calendar of a third subsystem that is remote from the online scheduling service subsystem via a communications network.

2. The method of claim 1, wherein:
the first client account data comprises the first information indicative of the planned future location of the first client entity within the particular time frame in the future, wherein the creating the first client account comprises importing the first information with the online scheduling service subsystem from the first calendar of the first subsystem that is remote from the online scheduling service subsystem;
the second client account data comprises the second information indicative of the planned future location of the second client entity within the particular time frame in the future, wherein the creating the second client account comprises importing the second information with the online scheduling service subsystem from the second calendar of the second subsystem that is remote from the online scheduling service subsystem;
the third client account data comprises the third information indicative of the planned future location of the third client entity within the particular time frame in the future, wherein the creating the third client account comprises importing the third information with the online scheduling service subsystem from the third calendar of the third subsystem that is remote from the online scheduling service subsystem;
the first listing data comprises information indicative of a location of the first construct within the particular time frame; and
the second listing data comprises information indicative of a location of the second construct within the particular time frame.

3. The method of claim 2, wherein:
generating the at least one proposed schedule comprises generating the at least one proposed schedule based on:
    the first client account data;
    the second client account data;
    the third client account data;
    the first listing data;
    the second listing data; and
    auxiliary data that comprises information indicative of an estimate of at least one of the following:
        a travel time within the particular time frame between the planned future location of the first client entity and the location of the first construct;
        a travel time within the particular time frame between the planned future location of the second client entity and the location of the second construct;
        a travel time within the particular time frame between the planned future location of the third client entity and the location of the first construct;
        a travel time within the particular time frame between the planned future location of the third client entity and the location of the second construct; or
        a travel time within the particular time frame between the location of the first construct and the location of the second construct.

4. The method of claim 1, wherein:
the first client account data comprises the first information indicative of any planned availability of the first client entity within the particular time frame in the future, wherein the creating the first client account comprises importing the first information with the online scheduling service subsystem from the first calendar of the first subsystem that is remote from the online scheduling service subsystem;
the second client account data comprises the second information indicative of any planned availability of the second client entity within the particular time frame in the future, wherein the creating the second client account comprises importing the second information with the online scheduling service subsystem from the second calendar of the second subsystem that is remote from the online scheduling service subsystem; and
the third client account data comprises the third information indicative of any planned availability of the third client entity within the particular time frame in the future, wherein the creating the third client account comprises importing the third information with the online scheduling service subsystem from the third calendar of the third subsystem that is remote from the online scheduling service subsystem.

5. The method of claim 4, wherein:
the first listing data comprises information indicative of any planned availability of the first construct within the particular time frame; and
the second listing data comprises information indicative of any planned availability of the second construct within the particular time frame.

6. The method of claim 4, wherein:
the first listing data comprises information indicative of a minimum length of time associated with any showing of the first construct; and
the second listing data comprises information indicative of a minimum length of time associated with any showing of the second construct.

7. The method of claim 1, wherein:
the first client account data comprises first information indicative of a calendar of at least one planned event of the first client entity in the future, wherein the creating the first client account comprises importing the first information with the online scheduling service subsystem from the first calendar of the first subsystem that is remote from the online scheduling service subsystem; and
the second client account data comprises second information indicative of a calendar of at least one planned event of the second client entity in the future, wherein the creating the second client account comprises importing the second information with the online scheduling service subsystem from the second calendar of the second subsystem that is remote from the online scheduling service subsystem.

8. The method of claim 1, wherein the first client account data comprises information indicative of at least one of the following:
    an earliest time of day that the first client entity prefers to attend any appointment at any construct;
    a latest time of day that the first client entity prefers to attend any appointment at any construct;
    a maximum length of time that the first client entity prefers to attend any appointment at any construct; or
    a preference of one day of the week over another day of the week that the first client entity prefers to attend any appointment at any construct.

9. The method of claim 1, wherein the second client account data comprises information indicative of at least one of the following:
    an earliest time of day that the second client entity prefers to attend any appointment at the second construct;
    a latest time of day that the second client entity prefers to attend any appointment at the second construct;
    a maximum length of time that the second client entity prefers to attend any appointment at the second construct; or a preference of one day of the week over another day of the week that the second client entity prefers to attend any appointment at the second construct.

10. The method of claim 1, wherein:
the first construct comprises a first piece of real estate;
the first client entity comprises a seller of the first piece of real estate;
the second construct comprises a second piece of real estate;
the second client entity comprises a seller of the second piece of real estate.

11. The method of claim 10, wherein the third client entity comprises a party with interest in acquiring at least one of the first piece of real estate or the second piece of real estate.

12. The method of claim 1, wherein the generating the at least one proposed schedule comprises:
identifying at least one first potential schedule based on:
the first client account data with a first weighting;
the second client account data with a second weighting;
the third client account data with a third weighting;
the first listing data with a fourth weighting; and
the second listing data with a fifth weighting;
identifying at least one second potential schedule based on:
the first client account data with a sixth weighting;
the second client account data with a seventh weighting;
the third client account data with an eighth weighting;
the first listing data with a ninth weighting; and
the second listing data with a tenth weighting; and
selecting at least one of the at least one first potential schedule or the at least one second potential schedule as the at least one proposed schedule.

13. The method of claim 1, further comprising, prior to receiving the request, with the online scheduling service subsystem:
generating a first link to the first listing; and
enabling the first link to be posted on a third party subsystem, wherein the receiving the request comprises receiving the request in response to the third client entity selecting the first link on the third party subsystem.

14. The method of claim 1, wherein the particular time frame begins at a time after the receiving.

15. An online scheduling service subsystem in communication with a first client device subsystem of a first client entity associated with a first construct, a second client device subsystem of a second client entity associated with a second construct, and a third client device subsystem of a third client entity in a system, the online scheduling service subsystem comprising:
at least one processor component;
at least one memory component; and
at least one communications component, wherein the online scheduling service subsystem is operative to:
receive first client account data associated with the first client entity from the first client device via the at least one communications component;
create a first client account with the first client account data received from the first client device using the at least one processor component;
receive second client account data associated with the second client entity from the second client device via the at least one communications component;
create a second client account with the second client account data received from the second client device using the at least one processor component;
receive third client account data associated with the third client entity from the third client device via the at least one communications component;
create a third client account with the third client account data received from the third client device using the at least one processor component;
access first listing data associated with the first construct;
create a first listing that comprises the first listing data using the at least one processor component;
access second listing data associated with the second construct;
create a second listing that comprises the second listing data using the at least one processor component;
receive a request from the third client account to schedule a showing that comprises a first appointment for the third client entity and the first client entity at the first construct and a second appointment for the third client entity and the second client entity at the second construct; and
in response to receiving the request, generate at least one proposed schedule for the showing using the at least one processor component based on:
the first client account data of the first client account;
the second client account data of the second client account;
the third client account data of the third client account;
the first listing data of the first listing; and
the second listing data of the second listing, wherein:
the first listing data comprises information indicative of a size of the first construct; and
the online scheduling service subsystem is operative to use the at least one processor component to determine a duration of time of the first appointment of the at least one proposed schedule using the information indicative of the size of the first construct.

16. The online scheduling service subsystem of claim 15, wherein the online scheduling service subsystem is further operative to facilitate selection of one of the at least one proposed schedule by at least one of the first client device subsystem, the second client device subsystem, or the third client device subsystem.

17. The online scheduling service subsystem of claim 16, wherein the online scheduling service subsystem is further operative to facilitate electronic communication between the third client device subsystem and at least one of the first client device subsystem or the second client device subsystem after the selection.

18. The online scheduling service subsystem of claim 15, wherein:
the first client account data comprises information indicative of a calendar of at least one planned event of the first client entity; and
the second client account data comprises information indicative of a calendar of at least one planned event of the second client entity.

19. The online scheduling service subsystem of claim 15, wherein the first client account data comprises information indicative of at least one of the following:
an earliest time of day that the first client entity prefers to attend any appointment at any construct;
a latest time of day that the first client entity prefers to attend any appointment at any construct;
a maximum length of time that the first client entity prefers to attend any appointment at any construct; or a preference of one day of the week over another day of the week that the first client entity prefers to attend any appointment at any construct.

20. A non-transitory computer-readable storage medium storing at least one program, the at least one program comprising instructions, which, when executed by at least one processor of an online scheduling service subsystem, cause the at least one processor to:

- access first client account data associated with a first client entity;
- access first listing data associated with a first construct;
- access second client account data associated with a second client entity;
- access second listing data associated with a second construct;
- access third client account data associated with a third client entity by synching with the online scheduling service subsystem calendar information from a calendar of a subsystem that is remote from the online scheduling service subsystem via a communications network;
- detect a request to schedule a showing within a particular time frame, wherein the showing comprises a first appointment for the third client entity and the first client entity with the first construct and a second appointment for the third client entity and the second client entity with the second construct; and
- in response to detecting the request, generate at least one proposed schedule for the showing within the particular time frame based on:
  - the first client account data;
  - the second client account data;
  - the synched calendar information that is indicative of an expected future location of the third client entity within the particular time frame;
  - the first listing data; and
  - the second listing data.

* * * * *